(12) United States Patent
Brooks et al.

(10) Patent No.: US 10,846,654 B2
(45) Date of Patent: Nov. 24, 2020

(54) PERPETUAL INVENTORY RECONCILIATION

(71) Applicant: WALMART APOLLO, LLC, Bentonville, AR (US)

(72) Inventors: Cristy Crane Brooks, Cassville, MO (US); David Blair Brightwell, Bentonville, AR (US); Benjamin D. Enssle, Bella Vista, AR (US); Jesse Lee Eaton, Springdale, AR (US); Matthew Jones, Bentonville, AR (US); Jeffrey Kerbs, Bella Vista, AR (US); Greg Bryan, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 250 days.

(21) Appl. No.: 16/165,664

(22) Filed: Oct. 19, 2018

(65) Prior Publication Data
US 2019/0130346 A1   May 2, 2019

Related U.S. Application Data

(60) Provisional application No. 62/579,116, filed on Oct. 30, 2017.

(51) Int. Cl.
  *G06Q 10/06* (2012.01)
  *G06Q 10/08* (2012.01)
  *G06Q 30/02* (2012.01)

(52) U.S. Cl.
  CPC ..... *G06Q 10/087* (2013.01); *G06Q 10/06315* (2013.01); *G06Q 30/0206* (2013.01)

(58) Field of Classification Search
  None
  See application file for complete search history.

(56) References Cited

U.S. PATENT DOCUMENTS 6,397,226 B1 * 5/2002 Sage ................ G06Q 10/087
                                                          705/22
7,480,623 B1   1/2009 Landvater
(Continued)

FOREIGN PATENT DOCUMENTS

WO   2016109251 A1   7/2016

OTHER PUBLICATIONS

Copenheaver, Blain R., "International Search Report", International Application No. PCT/US2018/056393, dated Dec. 20, 2018, 2 pages.

(Continued)

*Primary Examiner* — Paul Danneman

(57) ABSTRACT

Examples provide a perpetual inventory (PI) reconciliation system. A PI controller analyzes item data using a set of PI purge criteria and a set of weighted prioritization variables to select a highest priority seasonal inventory item having a positive PI value a per-item threshold time after an end-of-season (EOS) date for PI purge analysis. A PI controller determines if the selected item is a high confidence item or a low confidence item based on a set of confidence rules and item data. If the selected item is a high confidence item, a PI purge component sets an inventory value for the selected item to zero to eliminate the positive PI. If the selected item is a low confidence item, a verification component verifies the number of physical instances of the selected item. The inventory value is updated using the verified number of physical instances.

20 Claims, 18 Drawing Sheets

(56) References Cited

U.S. PATENT DOCUMENTS

| | | |
|---|---|---|
| 7,848,967 B2 | 12/2010 | Young |
| 8,321,303 B1 | 11/2012 | Krishnamurthy et al. |
| 9,280,757 B2 | 3/2016 | Parpia et al. |
| 2003/0216969 A1 | 11/2003 | Bauer et al. |
| 2008/0052205 A1 | 2/2008 | Dolley et al. |
| 2014/0344118 A1 | 11/2014 | Parpia et al. |
| 2016/0027068 A1 | 1/2016 | Brantley et al. |
| 2017/0004422 A1 | 1/2017 | Todd et al. |
| 2017/0116631 A1 | 4/2017 | Sarin et al. |
| 2017/0161674 A1 | 6/2017 | Jones et al. |
| 2017/0200106 A1 | 7/2017 | Jones et al. |

OTHER PUBLICATIONS

Copenheaver, Blain R., "Written Opinion", International Application No. PCT/US2018/056393, dated Dec. 20, 2018, 5 pages.

\* cited by examiner

FIG. 8

| | ITEM 804 | ITEM 806 | ITEM 808 |
|---|---|---|---|
| MAX MD 810 | YES | NO | YES |
| PERISHABLE ITEM 812 | NO | YES | NO |
| NO MODULAR HOME 814 | YES | NO | NO |
| WITHIN THRESHOLD TIME UNTIL NEXT SOS 816 | NO | NO | YES |

312

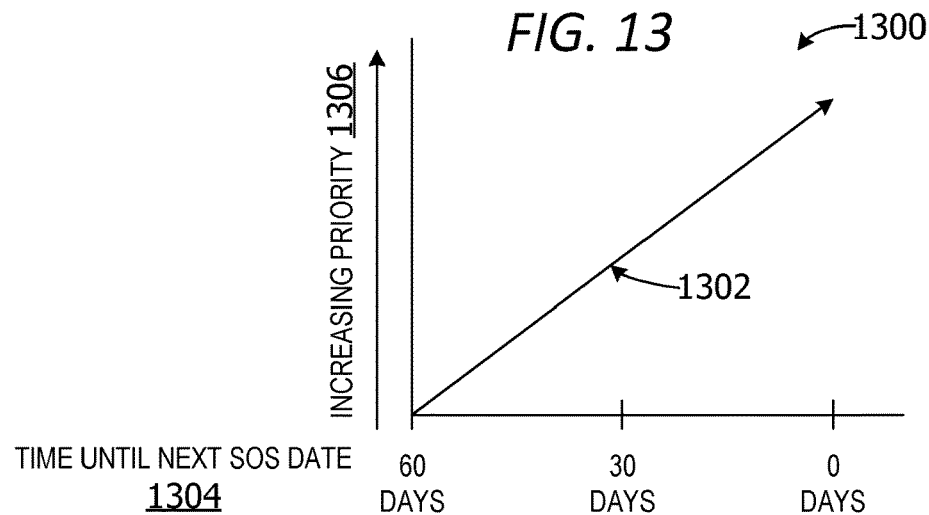
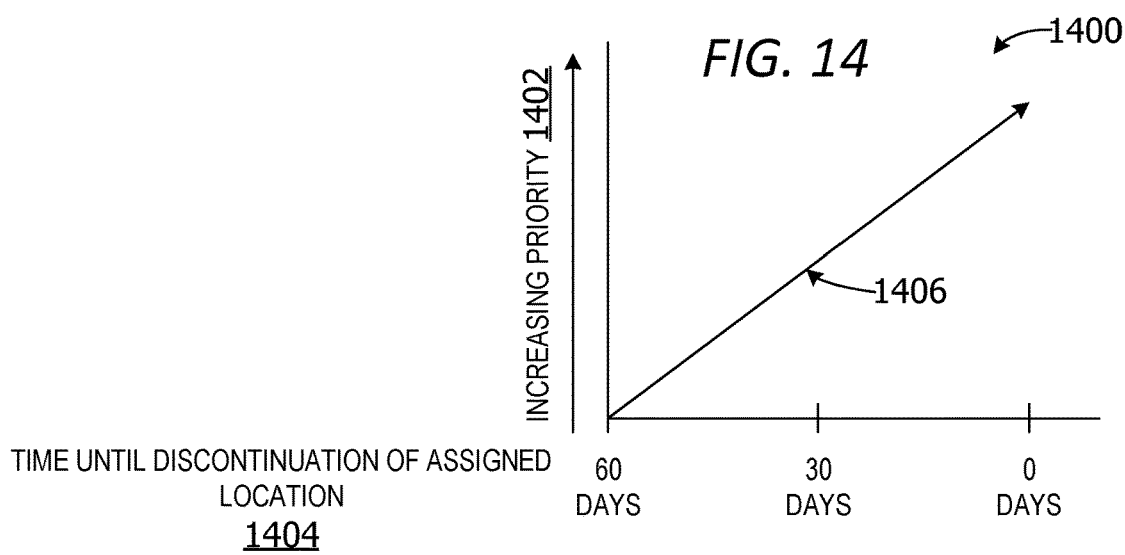
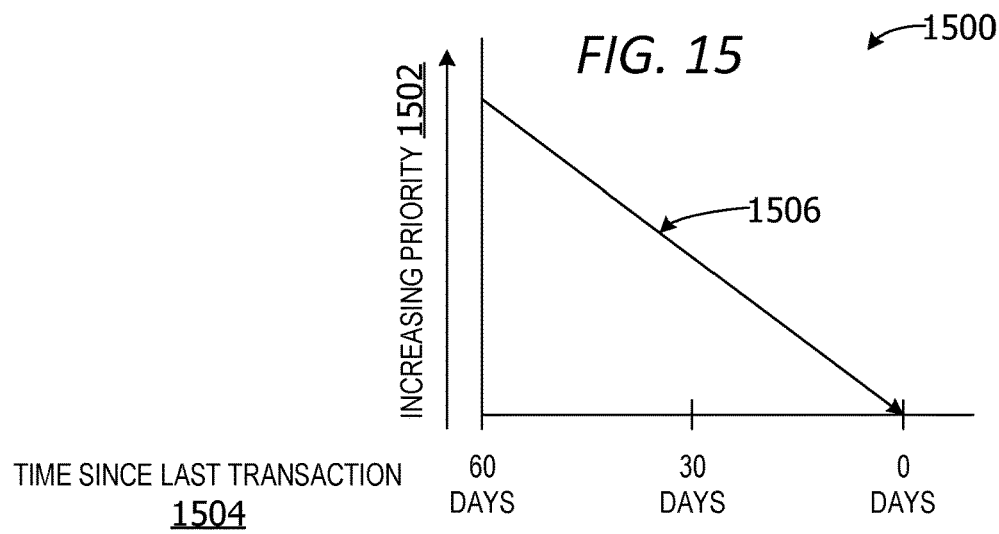

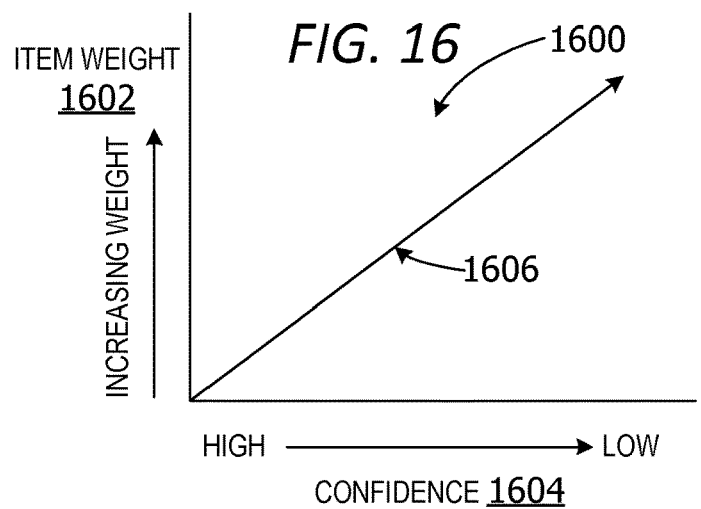
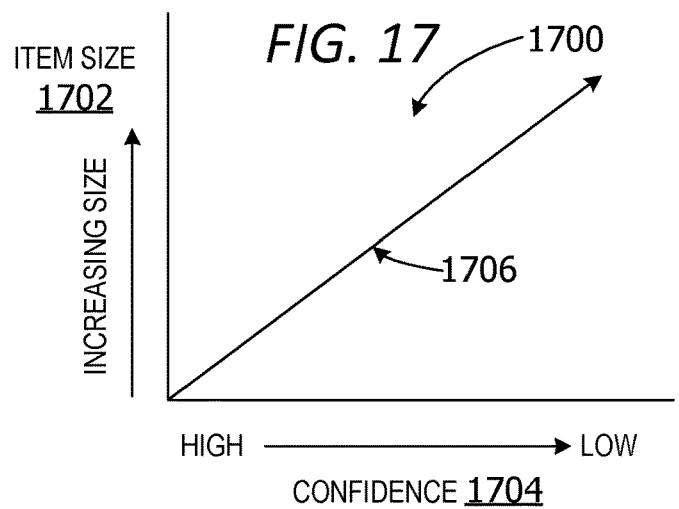
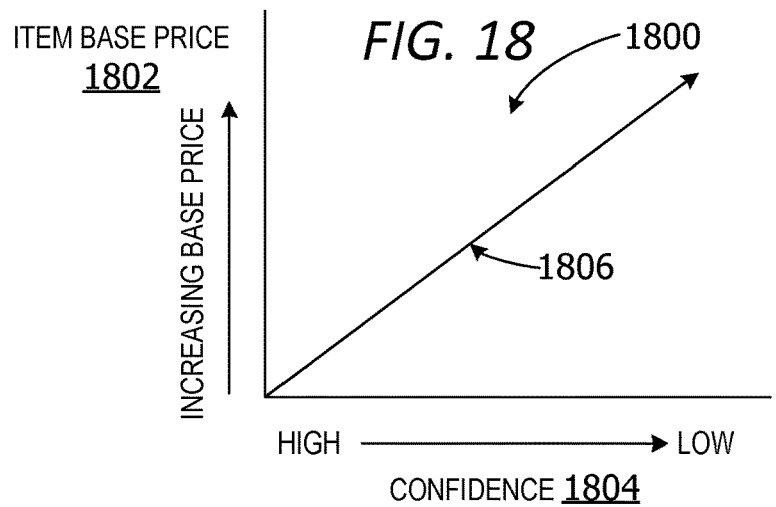

PERPETUAL INVENTORY RECONCILIATION

BACKGROUND

A perpetual inventory (PI) system refers to a system of continuously tracking transactions associated with items in inventory to update system inventory to maintain agreement of system inventory with physical inventory. However, errors in updating frequently occur due to inventory overstatements, inventory understatements, inventory shrink, missing inventory items, damaged inventory items, incorrectly scanned items, or misplaced inventory items. Updating errors or omissions sometimes result in disagreement between the number of physical items on-hand in physical inventory and the recorded number of items in system inventory. This can result in failure to adequately replenish on-hand inventory due to system inventory indicating a greater number of items than are actually physically present in on-hand inventory. Users can manually scan items in physical inventory to update system inventory. However, this is a time consuming and labor-intensive process which is also subject to error.

SUMMARY

Examples of the disclosure provide a computer-implemented method for perpetual inventory reconciliation. A perpetual inventory (PI) analysis component analyzes item data associated with a plurality of seasonal items using a set of PI purge criteria to identify a set of inactive inventory items. The plurality of seasonal items includes items associated with an inventory area having a positive PI value for a per-item threshold time after an end-of-season (EOS) date. The item data includes transaction data associated with the plurality of seasonal items. An EOS prioritization component selects a highest priority inventory item from the identified set of inactive inventory items using a set of weighted prioritization variables. A PI purge component sets an inventory value in system inventory record associated with the selected item to zero to eliminate the positive PI value on determining the selected item is a high confidence item based on a set of confidence rules. On determining the selected item is a low confidence item based on the set of confidence rules, a verification component analyzes sensor data obtained from a set of sensor devices associated with the inventory area to locate any physical instances of the selected item on-hand in the inventory area. On occurrence of substantially zero physical instances of the selected item on-hand in the inventory area based on the analyzed sensor data, the PI purge component sets the inventory value in the system inventory record associated with the selected item to zero. On locating a number of physical instances of the selected item on-hand within the inventory area based on the analyzed sensor data, a physical inventory value representing the number of physical instances of the selected item is calculated. The inventory value in the system inventory record associated with the selected item is set to the physical inventory value.

Other examples provide a system for perpetual inventory reconciliation. The system includes a memory and at least one processor communicatively coupled to the memory. A PI analysis component aggregates transaction data and analyzes the aggregated transaction data using a set of PI purge criteria to select an inactive inventory item having a positive PI value for a per-item threshold time following a last-recorded transaction associated with the selected item, the transaction data generated by a plurality of point-of-sale (POS) devices and stored in the memory and associated with the plurality of inventory items. A PI purge component analyzes item data associated with the selected item using a set of confidence rules to determine whether the selected item is a high confidence item or a low confidence item. The PI purge component removes the positive PI value by setting an inventory value in a system inventory record associated with the selected item to zero on determining the selected item is a high confidence item and resets a price assigned to the selected item to a base price. A verification component requests an item count to determine physical instances of the selected item on-hand in the inventory area on determining the selected item is a low confidence item.

Yet other examples provide one or more computer storage media, having computer-executable instructions for perpetual inventory reconciliation. The computer-executable instructions are executed to cause a computer to select an inventory item from a plurality of seasonal items associated with an inventory area using a set of PI purge criteria and a set of weighted priority variables on occurrence of a predetermined event. The selected item having a positive PI value for a per-item threshold time after an EOS date. The computer-executable instructions are further executed to cause the computer to set an inventory value in system inventory record associated with the selected item at zero to eliminate the positive PI value on determining a per-unit-price of the selected item is within a threshold per-unit-price range. The computer-executable instructions are further executed to cause the computer to analyze sensor data obtained from a set of sensor devices associated with the inventory area to calculate a physical inventory value representing a number of physical instances of the selected item within the inventory area and set the inventory value in the system inventory record associated with the selected item to the physical inventory value on determining the per-unit-price of the selected item is outside the threshold per-unit-price range.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is an exemplary block diagram illustrating a set of weighted prioritization variables for selecting seasonal items for PI purge.

FIG. 13 is an exemplary graph illustrating a time until next start-of-season (SOS) date prioritization variable for selecting an item for PI purge analysis.

FIG. 14 is an exemplary graph illustrating a time until discontinuation of an assigned location prioritization variable for selecting an item for PI purge analysis.

FIG. 15 is an exemplary graph illustrating a transaction-inactivity time prioritization variable for selecting an item for PI purge analysis.

FIG. 16 is an exemplary graph illustrating a confidence level for an item based on a weight of the item.

FIG. 17 is an exemplary graph illustrating a confidence level for an item based on a size of the item.

FIG. 18 is an exemplary graph illustrating a confidence level for an item based on a base price of the item.

Corresponding reference characters indicate corresponding parts throughout the drawings.

DETAILED DESCRIPTION

Figure 1:
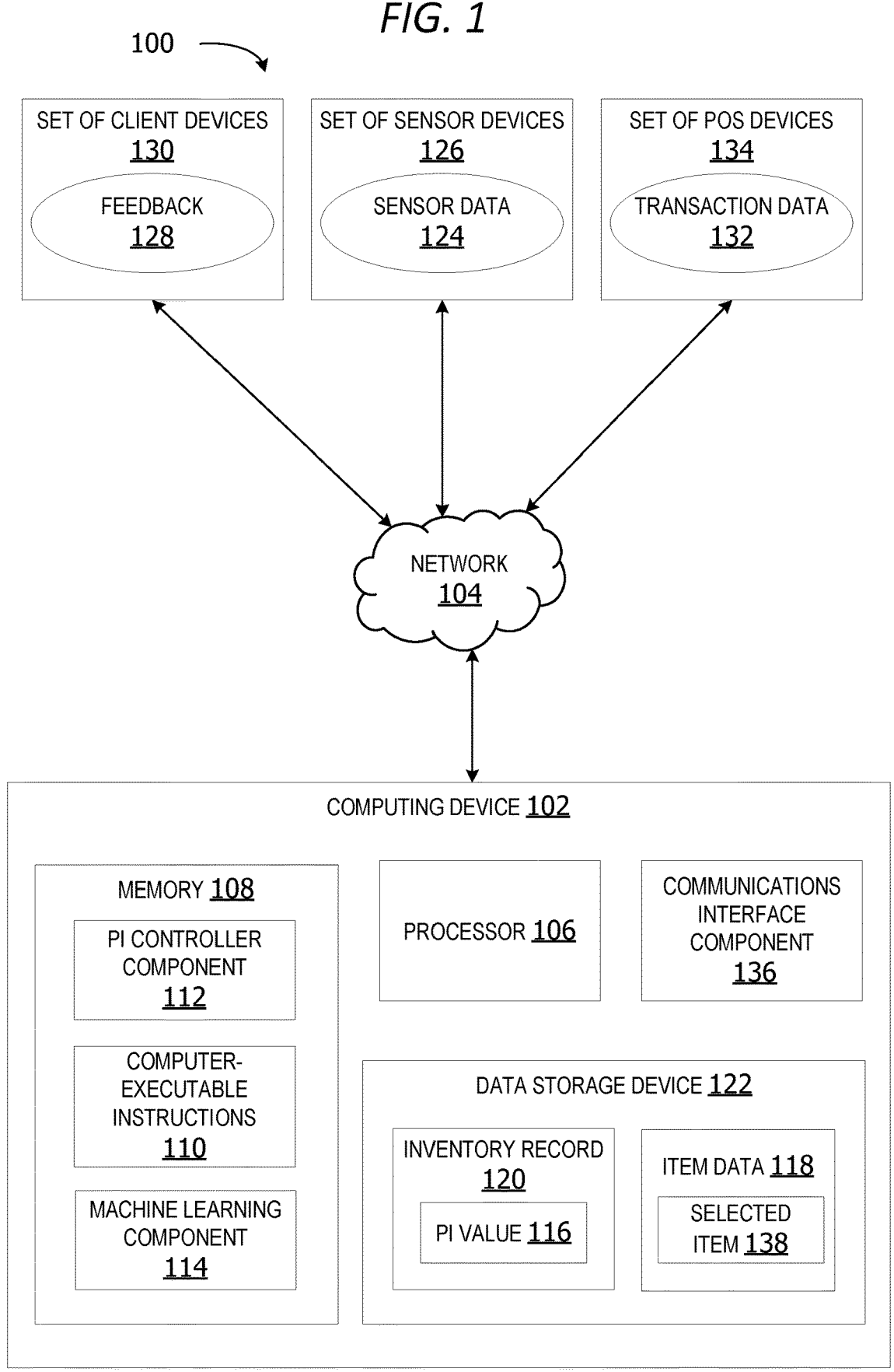
FIG. 1 is an exemplary block diagram illustrating a computing device for managing perpetual inventory (PI).

Referring to the figures, examples of the disclosure enable autonomous perpetual inventory (PI) reconciliation. In some examples, a PI controller selects an inventory item having a positive PI value for PI purge analytics based on PI purge criteria and weighted prioritization variables. This enables more efficient and accurate selection of seasonal items for PI purge.

In other examples, the PI controller identifies the selected inventory item as a high confidence item or a low confidence item based on a set of confidence rules. If the selected item is a high confidence item, the PI controller autonomously sets an inventory value of the selected inventory item to zero to purge the positive PI value associated with the selected item. This provides increased accuracy of system inventory records, reduces inventory errors, and eliminates risk of shrink due to inaccurate PI values which do not reflect on-hand physical inventory.

Referring again to FIG. 1, an exemplary block diagram illustrates a system 100 for PI reconciliation. The system 100 includes a computing device 102 for managing perpetual inventory (PI).

The computing device 102 represents any device executing instructions (e.g., as application programs, operating system functionality, or both) to implement the operations and functionality associated with the computing device 102. The computing device 102 can include a server, such as a back-end server or a cloud server available via a network 104.

The computing device 102 can also include other devices, such as desktop personal computers, kiosks, tabletop devices, industrial control devices, wireless charging stations, and electric automobile charging stations.

In other examples, the computing device 102 is implemented as a mobile computing device or any other portable device. In some examples, the mobile computing device 102 includes a mobile telephone, laptop, tablet, computing pad, netbook, gaming device, and/or portable media player. Additionally, the computing device can represent a group of processing units or other computing devices.

The network 104 is implemented by one or more physical network components, such as, but without limitation, routers, switches, network interface cards (NICs), and other network devices. The network 104 can be any type of network for enabling communications with remote computing devices, such as, but not limited to, a local area network (LAN), a subnet, a wide area network (WAN), a wireless (Wi-Fi) network, or any other type of network. In this example, the network 104 is a WAN, such as the Internet. However, in other examples, the network 104 is a local or private LAN.

In some examples, the computing device 102 includes a communications interface component 136. The communications interface component 136 in this example includes a network interface card and/or computer-executable instructions (e.g., a driver) for operating the network interface card. Communication between the computing device 102 and other devices, such as the set of client devices 130, the set of sensor devices 126, and/or the set of point-of-sale (POS) devices 134, can occur using any protocol or mechanism over any wired or wireless connection, such as the network 104. In some examples, the communications interface component 136 is operable with short range communication technologies such as by using near-field communication (NFC) tags.

In some examples, the computing device 102 has at least one processor 106 and a memory 108. The processor 106 includes any quantity of processing units and is programmed to execute computer-executable instructions 110 for autonomously managing PI. The computer-executable instructions 110 can be performed by the processor 106 or by multiple processors within the computing device 102 or performed by a processor external to the computing device 102. In some examples, the processor 106 is programmed to execute instructions such as those illustrated in the figures (e.g., FIG. 19, FIG. 20, FIG. 21, FIG. 22, and FIG. 23)

The computing device 102 further has one or more computer readable media such as the memory 108. The memory 108 includes any quantity of media associated with or accessible by the computing device 102. The memory 108 can be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via the network 104. For example, the applications can represent downloaded client-side applications that correspond to server-side services executing in a cloud.

The memory further stores one or more computer-executable components. Exemplary components include a PI controller component 112 and/or a machine learning component 114. The PI controller component 112, when executed by the processor 106 of the computing device 102, causes the processor 106 to analyze item data 118 and/or transaction data 132 using a set of one or more purge criteria and/or one or more weighted priority variables to select an inventory item from a plurality of seasonal items.

The machine learning component 114 in some examples includes pattern recognition analytics and/or predictive modeling to learn and/or adapt without being explicitly programmed. The machine learning component 114 is trained using a set of training data and/or feedback 128 from one or more users to fine-tune variable weights and/or thresholds utilized to manage PI.

The item data 118 includes data describing a selected item 138. The item data 118 can include a price-per-unit, dimensions of an item package, dimensions of an item, assigned location of an item, markdown (MD) of an item, as well as any other data associated with the item. In some examples, the item data 118 includes transaction data 132 for the selected item 138. The transaction data indicates a number of items sold during a given time period. For example, the transaction data 132 can indicate that ninety beach balls are sold in a week or that fifty candy canes are sold in a day.

In other examples, the transaction data includes the price at which an item was actually sold or purchased. The transaction value may not correlate with the base price due to one or more markdowns, clearance prices, coupons or some other discount. The transaction data in these examples includes information regarding how many items are actually sold and at what price. The transaction data 132 can include transaction data subsets for an item. For example, the transaction data can specify that "x" units of a selected item were sold at price A, y units of the selected item were sold at price B, etc.

A seasonal item is an item that is utilized, purchased, sold, or offered for sale during a particular period of time during the year. Seasonal items can include items associated with a season, such as summer, winter, spring, or autumn. For example, items associated with swimming are typically utilized during the summer while coats and snow boots are typically utilized during the winter.

Seasonal items can also include items associated with a holiday, such as, but not limited to, New Year's Day, Christmas, Easter, Hanukah, Saint Patrick's Day, Thanksgiving, Halloween, or any other holiday. Seasonal items in other examples include items associated with an event, such as the Olympic Games, Final Four, March Madness, Back-to-School, the Super Bowl, a movie release, the State Fair, or any other type of event associated with a particular day or limited period of time.

The selected item 138, in this example, has a positive PI value 116 for a per-item threshold time after an end-of-season (EOS) date. The PI value is a record indicating a number of units of an item in system inventory. The PI value may not agree with the number of physical instances of the selected item 138 on-hand in physical inventory.

In some examples, the per-item threshold time is a threshold unique to an item associated with a particular store. In other words, the per-item threshold time is unique at a store-item combination level. The per-store-item threshold time indicates a date at which the PI controller no longer expects to find physical instances of a particular item remaining in inventory after an EOS date associated with the item.

For example, if transaction history data indicates that sales of Halloween candy typically cease three weeks after Halloween at retail store A due to no physical units remaining in physical inventory while sales of Halloween candy typically cease two weeks after Halloween at retail store B due to lack of physical units remaining in on-hand inventory, the per-item threshold time for store A can be 22 days and the per-item threshold time for store B can be 15 days. The different per-item thresholds at different stores reflect differing sales trends for different items. These differences can be related to different demographics, store type, store size, store location, and other local level differences.

In the example above, the Halloween candy item having a per-item threshold item of 22 days is eligible for PI purge analysis at store A if system inventory shows a positive PI value indicating 100 units of Halloween candy remaining at store A 22 days after Halloween (the EOS date). Likewise, the Halloween candy item is chosen for PI purge analysis by the PI controller at store B if the system inventory shows a positive PI value indicating 100 units of Halloween candy remaining in system inventory at store B on the $15^{th}$ day after Halloween. The examples are not limited to 100 units of Halloween candy after the threshold time. Any positive PI value indicating any number of units of the selected item can be present the threshold time after the EOS date in accordance with other examples.

A PI value 116 is a number or count of a selected item in an inventory record 120 for the item in system inventory. The PI value 116 is a positive value if the number or count equals one or more. The PI value 116 can be greater than the actual number of physical items on-hand in physical inventory. In other words, the PI value 116 may not equal the actual number of physical instances of the item in inventory.

The PI controller component 112 in some examples analyzes item data 118 associated with a selected item using a set of one or more confidence rules to determine if the selected item is a high confidence item or a low confidence item. A high confidence item is an item for which PI purge can be performed without additional item count verification. In other words, a high confidence item is an item for which there is a high degree of confidence that the system inventory PI value does not represent actual physical instances of the item in physical inventory. Therefore, the PI value in system memory can be purged with high confidence that there are no physical instances of the seasonal items remaining on-hand. An item is high confidence where the item has a relatively low per-unit base price, a relatively small unit size, and/or a relatively lower item weight.

A low confidence item is an item for which there is a lower degree of confidence that the system inventory PI value does not represent physical instances in on-hand inventory. In other words, if a low confidence seasonal item has a positive PI value, there is less certainty as to whether there are actual physical instances in on-hand inventory. Therefore, an item count verification can be recommended to confirm on-hand inventory of these low confidence items. An item can be a low confidence item due to a higher unit base price, larger unit size, and/or heavier unit weight of the item relative to one or more other items or relative to a threshold value.

In one non-limiting example, if an item weights more than a threshold weight of fifty pounds, the item is a low confidence item. In another example, items having a weight equal to or greater than twenty-five pounds are low confidence items. In yet another non-limiting example, if an item has a base price that exceeds one-hundred dollars, the item is a low confidence item. Items having a height, length or width exceeding three feet are low confidence items in another non-limiting example. These are non-limiting examples of possible threshold values. The examples are not limited to the specific threshold values presented in these examples.

In another non-limiting example, a five-hundred-dollar Christmas light display kit can still be on-hand in physical inventory two months after Christmas even if Christmas candy canes are no longer present in the on-hand physical inventory two months after Christmas. This can occur because the larger size, higher price, or greater weight of the item makes sales of these items slower and/or less frequent. Likewise, the larger size and weight of these items can make the low confidence items less likely to be lost, misplaced, or otherwise subject to inventory shrink while smaller items, like candy, are more easily subject to loss, misplacement, damage, etc. In other words, small and/or inexpensive items are higher confidence then larger and/or high-end items in some examples.

The item data 118 and/or the set of one or more confidence rules can be stored in a data storage device 122. The data storage device 122 can include a set of one or more data storage devices storing the item data 118 for one or more items. The data storage device 122 can include one or more types of data storage devices, such as, for example, one or more rotating disks drives, one or more solid state drives (SSDs), and/or any other type of data storage device. In some examples, the data storage device 122 includes a database storing data, such as, but not limited to, the database 500 shown in FIG. 5 below.

In some examples, the PI controller component 112 sets the PI value in system inventory record 120 associated with the selected item to zero to eliminate the positive PI value if the selected item is a high confidence item. If the item is a low confidence item, the PI controller component 112 requests a physical item count for the selected item. The request for a physical item count is a request for sensor data 124 generated by a set of one or more sensor devices 126 associated with the plurality of seasonal items. The PI controller component 112 analyzes the sensor data 124 to determine the number of physical instances of the selected item which are physically present in the inventory area. The number of physical instances can be different than the PI value 116. The PI controller component 112 updates the PI value 116 for a low confidence item using the number of physical instances on-hand in physical inventory calculated based on the analysis of the sensor data 124.

The set of sensor devices 126 can include one or more scanners, one or more radio frequency identification (RFID) tag readers, one or more image capture devices, and/or any other suitable sensor. In some examples, the RFID tag readers include one or more RFID tag readers mounted on shelves, one or more RFID tag readers mounted on ceilings or walls, and/or one or more hand-held RFID tag readers.

A scanner in the set of sensor devices 126 includes a hand-held scanner, as well as an autonomous, mobile robotic sensor device in other examples. The mobile robotic sensor device in some examples is a device having a set of one or more wheels, a motor, a power source, a set of one or more sensor devices, and an auto-navigation system. A scanner can include a device for reading a barcode, a matrix barcode, an image capture device, or any other type of device for reading an item identifier. An image capture device is a device for generating an image of an item or part of an item, such as, but not limited to, a camera or an infrared imaging device.

The machine learning component 114, when executed by the processor 106 of the computing device 102, optionally causes the processor 106 to generate an updated set of weighted prioritization variables using feedback 128 received from a set of one or more client devices 130. The feedback includes data identifying items which should have undergone PI reconciliation but were not selected. The feedback 128 optionally also identify items which were selected for PI reconciliation which were not yet ready for PI purge.

The machine learning component 114 optionally generates the updated set of weighted prioritization variables based on analysis of historical transaction data, such as transaction data 132 received from a set of one or more POS devices 134. A POS device is a device for performing a transaction associated with one or more items. The transaction data 132 generated by the set of POS devices 134 can be stored on the data storage device 122, on a remote data storage device, on a cloud storage, or on any other data storage device.

In some examples, the computing device 102 is located remotely from the inventory area. In other examples, the computing device 102 is located locally to the inventory area.

Figure 2:
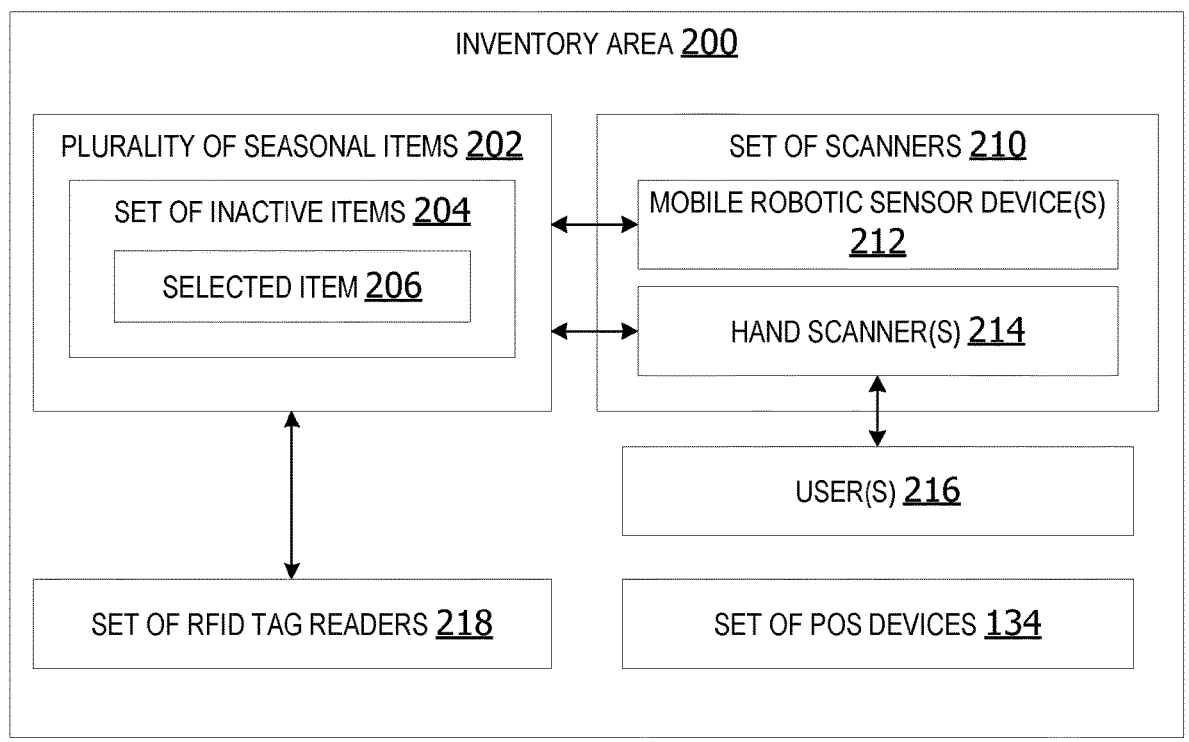
FIG. 2 is an exemplary block diagram illustrating an inventory area associated with a plurality of seasonal items.

FIG. 2 is an exemplary block diagram illustrating an inventory area 200 associated with a plurality of seasonal items 202. The plurality of seasonal items 202 includes items having a positive PI value for a per-item threshold time after an end-of-season (EOS) date. The per-item threshold time is a threshold time after a last transaction or a threshold time after the end of the season for a particular item, or a combination of a time after a last transaction and after the end of an associated season relative to the particular item. Each item can have a different per-item threshold time.

In a non-limiting example, the per-item threshold time for Valentine's Day candy is seven days after Valentine's Day while the per-item threshold time for Christmas lights is thirty days after Christmas Day. In another example, the per-item threshold time for Valentine's Day candy is three days and the per-item threshold time for Christmas lights is two weeks (21 days). The examples are not limited to the threshold values of the examples above. A per-item threshold time can be any user-selected threshold time.

The plurality of seasonal items 202 includes items associated with a time of year or event. A seasonal item is an item which is typically sold, purchased, and/or utilized during a particular time period during the year. For example, the plurality of seasonal items 202 can include items associated with a particular season of the year, a holiday, time of the year, or an event. An event can include an election year, a sporting event, an entertainment event, an educational event, or any other type of event.

A set of inactive items 204 is a set of one or more seasonal items in the plurality of seasonal items which have not been associated with a transaction for a threshold time period. In other words, an inactive item is an item which has not been purchased by a customer or sold by a store for a given period of time.

The selected item 206 is an inventory item in the plurality of seasonal items 202 selected by a PI controller component for PI reconciliation, such as the PI controller component 112 in FIG. 1. The PI controller component selects an item from the plurality of seasonal items 202 in this example, based on an analysis of item data for each item in the plurality of seasonal items 202, transaction data 132 for each item in the plurality of seasonal items 202, and a set of PI purge criteria.

The transaction data 132 is data generated by a set of one or more POS devices 208. The set of POS devices 134 is a set of one or more POS devices, such as, but not limited to, the set of POS devices 134 in FIG. 1. In this example, the set of POS devices 134 are located within the inventory area 200. However, in other examples, one or more of the POS devices are located remotely relative to the inventory area 200.

In some examples, the inventory area 200 includes a set of sensor devices, such as the set of sensor devices 126 in FIG. 1. The set of sensor devices can include a set of one or more scanners 210. A scanner in the set of scanners 210 can include a barcode reader for reading a barcode, such as a universal product code (UPC), a matrix barcode, or any other type of barcode encoding data associated with an item.

A scanner in the set of scanners 210 can include one or more mobile robotic sensor device(s) 212 for autonomously moving throughout the inventory area and scanning physical items in the inventory area 200. The set of scanners 210 can also include one or more hand scanner(s) 214 utilized by one or more user(s) 216. A user can manually scan a barcode, label, or other identifier associated with an item in the inventory area 200.

The inventory area 200 can also include a set of one or more RFID tag readers 218. An RFID tag reader can be a stationary reader mounted to a shelf, pole, wall, ceiling, or other structure within the inventory area. The RFID tag reader can also be a hand-held device utilized by a user for scanning items in the inventory area 200.

Figure 3:
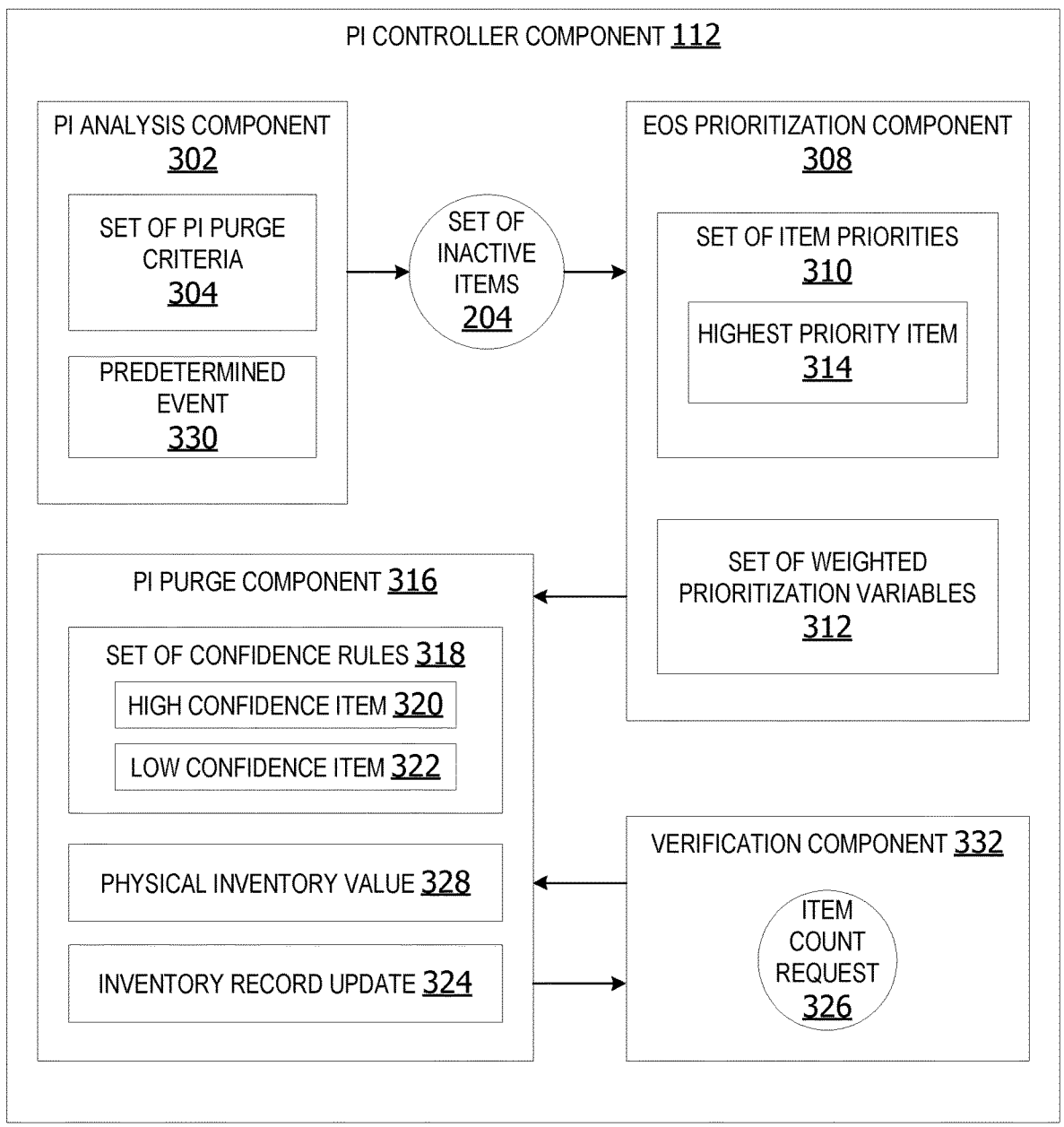
FIG. 3 is an exemplary block diagram illustrating a PI controller.

FIG. 3 is an exemplary block diagram illustrating a PI controller. The PI controller component 112 is a component for managing PI reconciliation. The PI controller component 112 includes a PI analysis component 302. The PI analysis component 302 analyzes item data associated with a plurality of seasonal items using a set of PI purge criteria 304 to identify the set of inactive items 204.

The PI controller component 112 can include an end-of-season (EOS) prioritization component 308. The EOS prioritization component 308 assigns a set of item priorities 310 to the set of inactive items 204 based on a set of weighted prioritization variables 312 and item data 118. The set of weighted prioritization variables 312 includes one or more variables for determining a priority of each item in the set of inactive items 204.

In some examples, the set of weighted prioritization variables 312 indicates that a perishable item has higher priority than a non-perishable item. The EOS prioritization component 308 in this non-limiting example assigns a higher priority to the perishable items in the set of inactive items 204 and a lower priority to non-perishable item in the set of inactive items 204.

The EOS prioritization component 308 selects a highest priority item 314 from the set of inactive items 204 for PI reconciliation. The highest priority item 314 is the item ready for PI purge based on the set of PI purge criteria 304 and the set of weighted prioritization variables 312.

A PI purge component 316 is included within the PI controller component 112 in some examples. The PI purge component 316 analyzes item data 118 associated with the selected item using a set of confidence rules 318 to determine whether the selected item is a high confidence item 320 or a low confidence item 322. The set of confidence rules 318 includes one or more rules.

In some examples, the set of confidence rules 318 includes a per-item threshold size range of an item. If the size of the item is within the threshold range, the item is a high confidence item. For example, if the threshold size range is a maximum of two-feet tall, then a six-foot tall Christmas tree would exceed the threshold size range indicating that the Christmas tree item is a low confidence item. The Christmas tree is a low confidence item in some examples because physical inventory count is more easily performed due to the size of the item relative to other smaller items. In other examples, the Christmas tree is identified as a low confidence item due to the amount of inventory space consumed by the item. In such cases, it is of greater importance to verify the presence or absence of these large items in physical inventory to reduce the amount of space consumed by these seasonal items in physical inventory.

In another example, the set of confidence rules 318 includes a per-item price threshold. If the price of an item is within the threshold range, the item is a high confidence item. For example, if the per-item price threshold is one-hundred dollars, a box of Christmas lights having a base price of $20 is classified as a high confidence item and another box of Christmas lights having a base price of $125 is classified as a low confidence item. The items having the higher base price are identified as low confidence in some examples because the items have greater value which makes inventory verification more economical. Likewise, it is cost prohibitive to spend time and resources performing inventory verification for high confidence, inexpensive items.

In yet another example, the set of confidence rules 318 includes a per-item threshold weight range. If the weight of an item is within the per-item threshold weight range, the item is a high confidence item. For example, if a per-item threshold weight range is ten pounds, a box of candy canes weighing twelve ounces is identified as a high confidence item. An artificial Christmas tree weighing twenty pounds is identified as a low confidence item in this example. The larger, heavier Christmas tree is low confidence in this example because these items are slower to sell and therefore, more likely to remain in physical inventory after the EOS. Furthermore, the smaller, lighter weight items are high confidence in some examples due to the time and expensive involved in performing physical inventory verification. The PI controller has greater confidence that the lighter weight items are no longer in physical inventory due to their less significant weight and portability, which decreases the likelihood these items have remained in physical inventory post EOS. Larger and heavier items are more likely to be found and identified during an item count for inventory verification in other examples.

If the selected item is a high confidence item 320, the PI purge component 316 generates an inventory record update 324 to set an inventory value in the system inventory record associated with the selected item to zero. Setting the inventory value to zero eliminates the positive PI value.

If the selected item is a low confidence item 322 based on the set of confidence rules 318, a verification component 332 sends an item count request 326 to at least one computing device. The item count request 326 requests sensor data generated by a set of sensor devices associated with the inventory area to calculate a physical inventory value 328. The physical inventory value 328 indicates a number of physical instances of the selected item on-hand in the inventory area.

In some examples, the PI controller component 112 selects an inventory item for PI purge analysis on occurrence of a predetermined event 330. The predetermined event 330 is an occurrence of an absence of transactions associated with an item for a maximum per-item threshold time in other examples.

In another non-limiting example, the occurrence of the predetermined event 330 is be a predetermined date. The predetermined event 330 includes a threshold transaction-inactivity time following a final price markdown associated with an item, in other examples.

Figure 4:
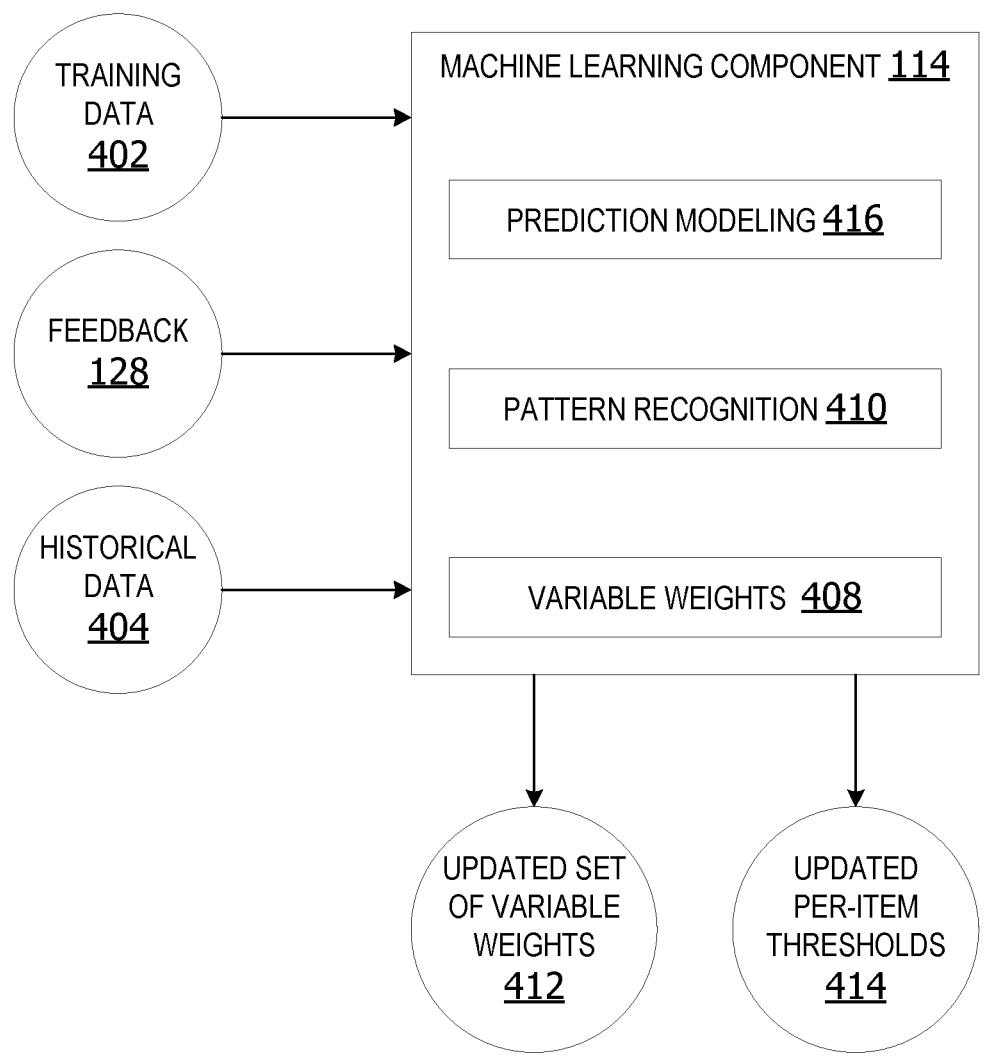
FIG. 4 is an exemplary block diagram illustrating a machine learning component for generating weighted prioritization variables.

FIG. 4 is an exemplary block diagram illustrating a machine learning component for generating weighted prioritization variables. The machine learning component 114 is a component for generating variable weights 408 for the set of prioritization variables, such as the machine learning component 114 in FIG. 1. The machine learning component 114 is initially trained using training data 402 and historical data 404 to generate the current variable weights 408. The training data 402 optionally includes historical PI data and seasonal item sales trends. The historical data 404 includes inventory data, pricing data, markdown data, seasonal start dates, seasonal end dates and/or transaction data 132.

The machine learning component 114 in some examples includes algorithms for analyzing data and generating data-driven predictions for PI levels and expected seasonal item sales trends based on prediction modeling. The machine learning component 114 optionally also include pattern recognition 410 for predicting future PI trends for one or more items in the plurality of seasonal items 202.

In some examples, pattern recognition 410 uses transaction history and sales trends to determine patterns of item inventory levels at various post-season markdown prices. In a non-limiting example, the pattern recognition 410 analyzes historical data to determine that if the level of sales of candy corn drops-off or stops when the candy corn item is marked down to 90% off, there are no physical instances of the candy corn on-hand in physical inventory even if system inventory shows some number of candy corn items still in PI.

The machine learning component 114 in other examples also receives inventory-related feedback 128 from a plurality of sources, such as the feedback 128 generated by the set of client devices 130 in FIG. 1. The feedback 128 includes user feedback regarding item selection for PI purge. For example, feedback 128 indicates that perishable food items are remaining in PI too long. The machine learning component 114 uses this feedback to increase the weight given to the prioritization variable associated with perishable items and items having an expiration date.

The updated set of variable weights 412 are utilized by the EOS prioritization component to more accurately select the highest priority item from the plurality of seasonal items. In other words, the machine learning component 114 analyzes feedback 128 to adapt, refine, and improve selection of items for PI reconciliation.

In other examples, feedback 128 and historical data 404 is utilized by the machine learning component 114 to adjust or update per-item thresholds 414, such as, but not limited to, the per-item post EOS threshold time or the per-item transaction-inactivity time. For example, if the feedback 128 indicates PI purge is occurring too soon for a selected item, the machine learning component 114 utilizes the feedback to increase the per-item post EOS threshold time for that selected item.

In other examples, the machine learning component 114 receives input including the feedback 128, training data 402, and historical data 404, as well as other item-related data, such as transaction data. The machine learning component 114 analyzes this input using pattern recognition 410 and prediction modeling 416 to predict PI for seasonal items and adjust prioritization variable weights and/or per-item thresholds used for managing PI. An EOS prioritization component, such as the EOS prioritization component 308 in FIG. 3 utilizes the updated set of variable weights 412 with the set of prioritization variables to generate the set of weighted prioritization variables. The set of weighted prioritization variables are utilized by the EOS prioritization component to select a highest priority item for PI purge from a plurality of seasonal items.

Figure 5:
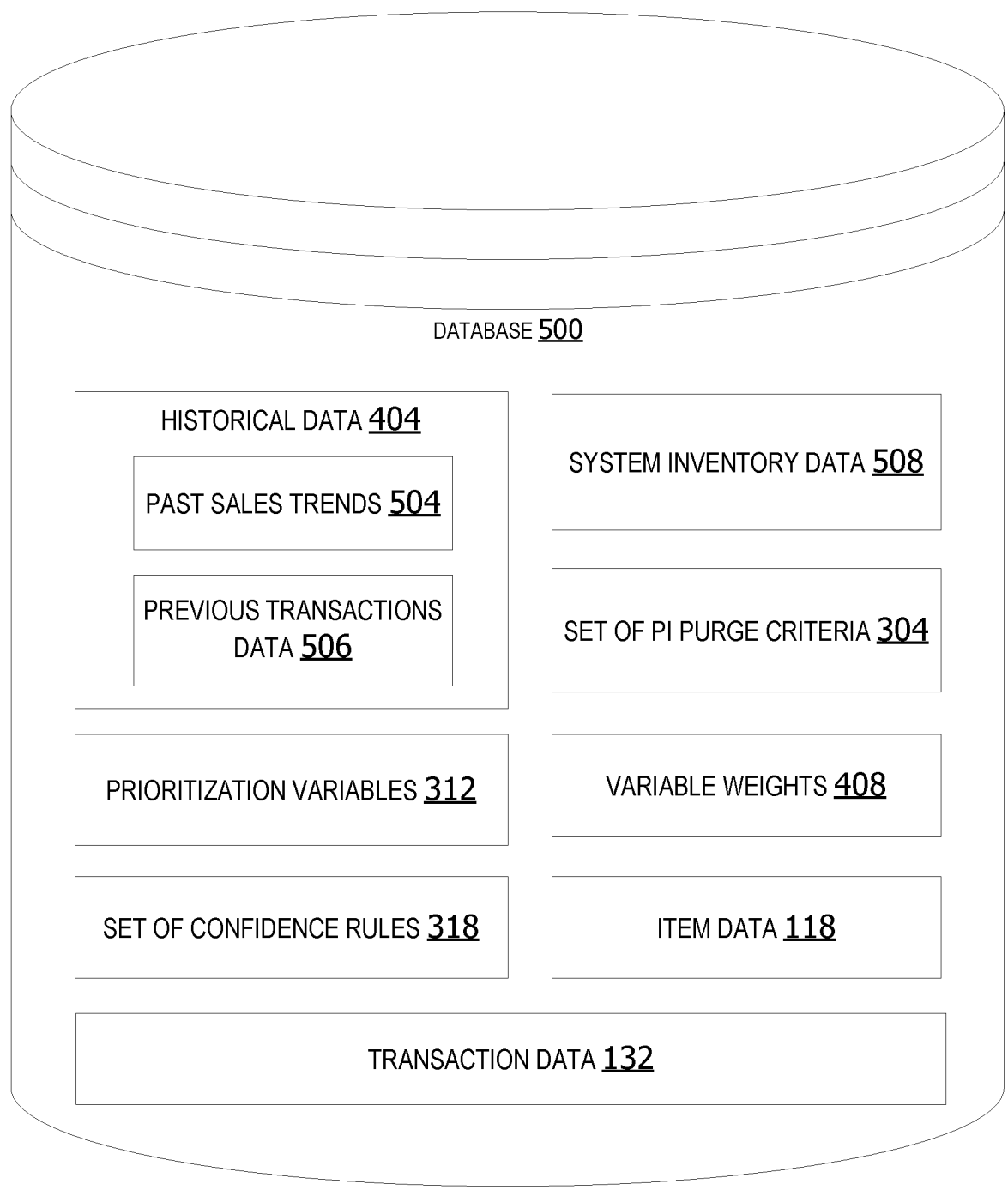
FIG. 5 is an exemplary block diagram illustrating a database for storing data associated with managing PI.

FIG. 5 is an exemplary block diagram illustrating a database for storing data associated with managing PI. The database 500 is a structured set of data on a data storage device, such as the data storage device 122 in FIG. 1. The database 500 in some examples stores historical data 404, such as the historical data 404 in FIG. 4. The historical data 404 includes past sales trends 504 and/or previous transactions data 506 for one or more items in inventory. The database 500 optionally also store system inventory data 508, the set of PI purge criteria 304, prioritization variables 312, variable weights 514, set of confidence rules 318, item data 118, transaction data 132, or any other data associated with managing PI.

Figure 6:
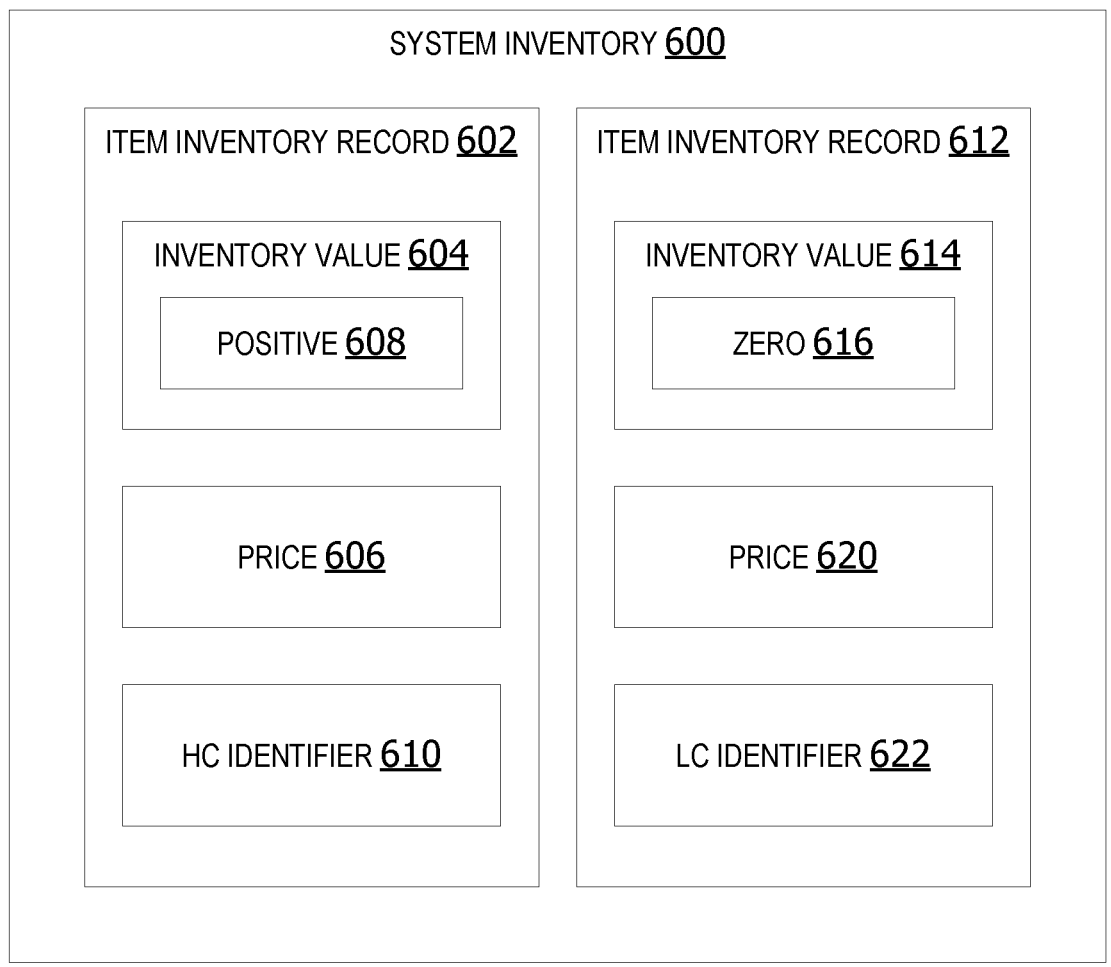
FIG. 6 is an exemplary block diagram illustrating a system inventory.

FIG. 6 is an exemplary block diagram illustrating a system inventory 600. The system inventory 600 includes a record for each item type in inventory. An inventory value 604 indicates the number of items in the system inventory. The inventory record 602 for a first item includes an inventory value 604. The inventory value 604 is equal to the actual number of physical instances of the first item on-hand in physical inventory in some examples. In other examples, the inventory value 604 is greater than the actual number of physical instances on-hand in physical inventory. If the inventory value 604 shows a higher number of items in system memory than the actual number of physical instances, the inventory value 604 has a positive 608 inventory value 604 in system inventory 600. The inventory value 614 is a value, such as, but not limited to, the physical inventory value 328 in FIG. 3.

The item inventory record 602 for the first item optionally also include a price 606 of the item. The price 606 is an item base price and/or the current markdown (MD) price of the item.

The item inventory record 602 optionally also include a high confidence (HC) identifier 610 indicating the item is a high confidence item or a low confidence (LC) identifier 622 indicating the item is a low confidence item.

During a PI purge operation, if a second item associated with item inventory record 612 is a high confidence item or an item count determines the item is not found in physical inventory, the inventory value 614 in the item inventory record 612 is set to zero 616. Setting the inventory value to zero 616 eliminates the positive PI. When the inventory value is set to zero, the price 620 of the item is reset to a base price. The inventory value 614 is a value, such as, but not limited to, the physical inventory value 328 in FIG. 3.

Figure 7:
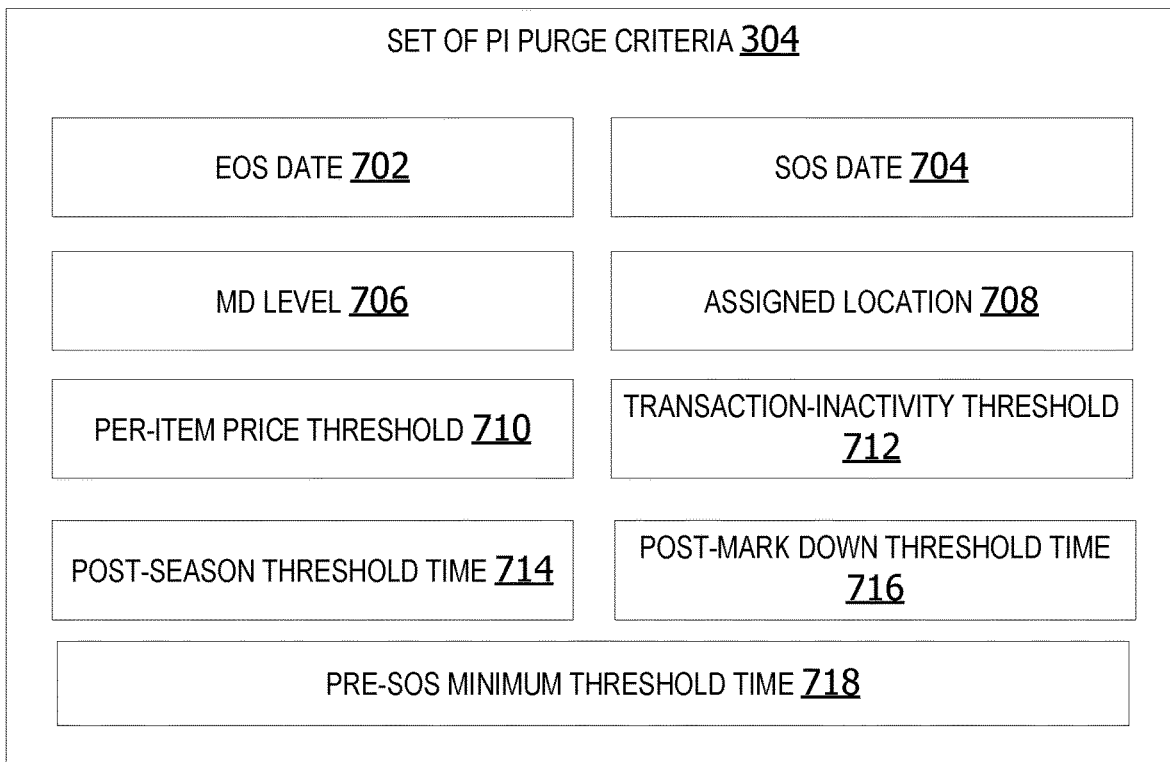
FIG. 7 is an exemplary block diagram illustrating a set of PI purge criteria for identifying seasonal items for PI purge.

FIG. 7 is an exemplary block diagram illustrating a set of PI purge criteria 304 for identifying seasonal items for PI purge. The set of PI purge criteria 304 includes an EOS date for each item, a start of season (SOS) date 704 for each item, a current markdown (MD) level 706 for each item, an assigned location 708 for each item, a per-item price threshold 710, a transaction-inactivity threshold for each item, a post-season threshold time 714 for each item, a post-markdown threshold time 716, and/or a pre-SOS minimum threshold time 718.

The EOS date 702 marks the end of a season date for an item. In a non-limiting example, Halloween costumes have an EOS date on October 31. A SOS date 704 is a first day of a season for a particular item. The SOS date 704 for Christmas items in another example is a day in September or October. The MD level 706 is the current markdown for a particular item. A seasonal item can be marked down after the EOS for that item to 25% off, 50% off, 75% off, 90% off, or any other type of discount level.

The assigned location 708 is a modular home or location within the inventory area in which a given item is displayed. If an item no longer has a modular home or assigned location, the item can be selected for PI purge. An item may not have a modular home or assigned location if the item has been moved to a clearance bin, markdown area, blow-out basket (BOB), or other temporary location because space previously assigned to that item has been assigned to another item.

When items are moved to a BOB, the items can be placed in shopping carts, clearance bins, or other clearance areas. Clearance markdown signage can be added to the BOB. The BOB can be moved to a designated area of a store or other portion of an inventory area.

For example, if swim suits are assigned to hang on a given rack during the summer months and fall clothing items are assigned to hang on the same rack during the fall months, the swimming suits will have no modular home or assigned location during the fall months.

The per-item price threshold 710 is a PI purge criterion specifying that when an item reaches a pre-determined markdown price for a threshold time, the item should be added to the set of inactive items or selected for PI purge. In some examples, the per-item price threshold 710 specify that trick-or-treat bags having a base price of five dollars are eligible for PI purge after markdowns change the price to fifty cents. The per-item price threshold 710 indicates that after marking the bags down to fifty cents each, no more trick-or-treat bags are expected to remain in actual physical inventory. Therefore, if a positive PI value remains in system inventory for the trick-or-treat bags, the trick-or-treat bags should undergo autonomous PI purge to eliminate the PI.

In another example, if candy corn is marked down to 90%, the final price for the candy corn after the 90% price markdown is the per-item price threshold 710. When the candy corn price reaches the per-item price threshold 710, the item can be selected for PI purge. In one example, the candy corn item is not selected for PI purge prior to reaching the per-item price threshold.

The set of PI purge criteria 304 in other examples includes a per-item transaction-inactivity threshold 712. The transaction-inactivity threshold 712 is an item-specific amount of time after the last transaction or an amount of time without any new transactions associated with a given seasonal item.

In one non-limiting example, the per-item transaction-inactivity time for candy Easter eggs is three days while the per-item transaction-inactivity time for an animatronic reindeer is thirty days. In this example, the animatronic reindeer is added to the set of inactive items by the PI analysis component and/or selected for PI purge by the EOS prioritization component on occurrence of thirty days without transaction activity associated with the item. In one example, the animatronic reindeer item is not selected for PI purge prior to reaching the transaction-inactivity threshold 712 time.

The post-season threshold time 714 is a per-item threshold time after an EOS date. Each item can have a different post-season threshold time. In some examples, if an item retains a positive inventory value in system inventory a threshold time period after the EOS for that item, the PI analysis component adds the item to the set of inactive items and/or the EOS prioritization component selects the item for autonomous PI purge.

In one non-limiting example, the post-season threshold time 714 for an artificial Christmas tree is 21 days. If system inventory shows a positive inventory value for the artificial Christmas trees 21 days after Christmas, the artificial Christmas tree item is added to the set of inactive items for PI reconciliation. In another example, the Christmas tree item is not selected for PI purge prior to reaching the per-item post-season threshold time 714 after the item's EOS date.

The post-markdown threshold time 716 is a threshold item period to wait after marking an item down prior to placing the item in the set of inactive items and/or selecting the item for PI purge. In one example, the post-markdown threshold time 716 is a maximum amount of time to wait after a final price markdown of the item prior to PI purge. In other examples, the post-markdown threshold time 716 includes a minimum amount of item to wait after any price markdown without any new transactions occurring associated with the item prior to performing a PI purge associated with the item.

The pre-SOS minimum threshold time 718 is the time remaining until the start of the next season for the item. In a non-limiting example, if a gardening gloves item has a SOS date on March 1 and an EOS date on November 30, the pre-SOS minimum threshold for the item indicates that 30 days prior to the next SOS date, the PI purge should be performed. In this example, the gardening gloves item is selected for PI purge on or before February 1 to ensure PI is cleared out before the start of the next season for the gardening gloves.

FIG. 8 is an exemplary block diagram illustrating a set of weighted prioritization variables 312 for selecting seasonal items for PI purge from a set of inactive items. The set of inactive items in this example includes item 804, item 806, and item 808. Each prioritization variable in the set of weighted prioritization variables 312 can be assigned a different weight to determine the priority of each item. The item having the highest priority is selected for the next PI purge operation.

Each priority variable can be given an equal weight in some examples. Where each priority variable has equal weight, the item having the most positive variables is selected. In this example, item 804 which is set to the maximum markdown (Max MD) 810, has no modular home 814, is within a threshold time until a next SOS 816 is the highest priority item.

In another example, if the perishable item 812 variable is given greater weight than the other variables, item 806 which is the only perishable item in the set of inactive items, is the highest priority item. For example, a perishable item can be, without limitation, watermelon, pumpkins or any other type of perishable item.

If the max MD 810 and being within a threshold item until the next SOS 816 is given greatest weight, then item 808 is selected as the highest priority item. Thus, item selection for PI purge can be adjusted by updating the set of weighted prioritization variables to dynamically improve item selection and efficiency of PI purge. This avoids selection of items for PI purge that are not yet eligible for PI purge, such as items which are still having current transactions, items which are still available in physical inventory, etc.

The examples are not limited to the weighted prioritization variables shown in FIG. 8. The set of weighted prioritization variables can include other variables, such as, but not limited to, an item expiration date, a transaction-inactivity time, a maximum time after final MD, an assigned location discontinuation date, or any other variables for selecting an item for PI purge. An assigned location discontinuation date is a date at which a location assigned to a first item will be reassigned to a different second item. The assigned location can be discontinued because the item is an out-of-season or inactive item.

Figure 9:
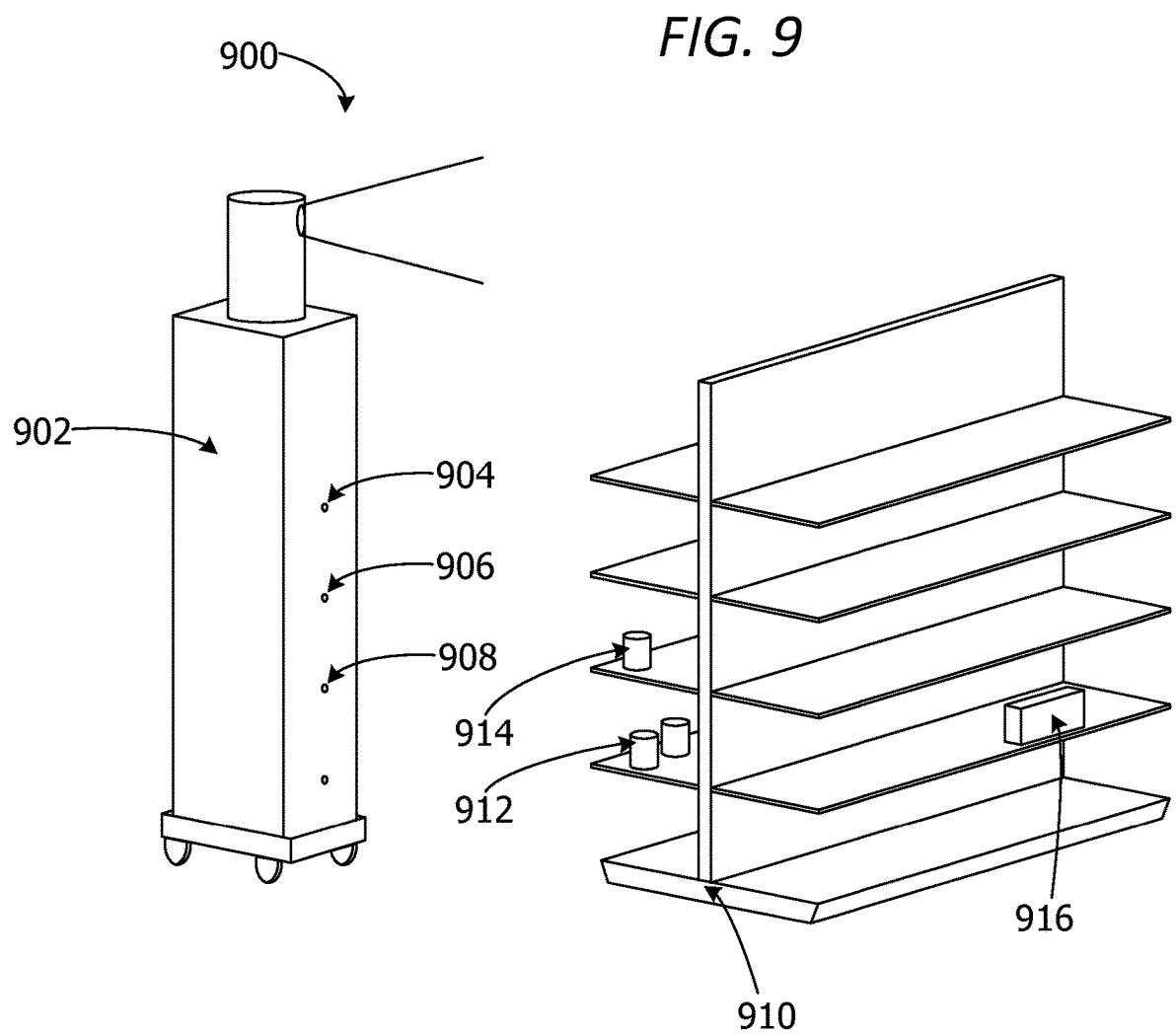
FIG. 9 is an exemplary block diagram illustrating a mobile robotic sensor device associated with an inventory area.

FIG. 9 is an exemplary block diagram illustrating a mobile robotic sensor device 902 associated with the inventory area 900. The inventory area is an area, such as, but not limited to, the inventory area 200 in FIG. 2. The mobile robotic sensor device 902 is an autonomous sensor robot, such as, but not limited to, the mobile robotic sensor device(s) 212 in FIG. 2.

The mobile robotic sensor device 902 is a mobile device having a set of sensors, such as sensor 904, 906, and 908. The sensors can include RFID tag readers, barcode readers, image capture devices (cameras), or any other type of sensor for identifying items in the inventory area 900.

The mobile robotic sensor device 902 generates sensor data associated with items within the inventory area, such as items 912, 914, and 916 on shelf 910 in the inventory area 900. The shelf 910 can be any type of display for items, such as a display case, set of shelves, a refrigerated display, a warmer, a freezer display, a rolling cart, or any other item display. The sensor data can include image data, RFID tag data, scan data, barcode data, or any other type of data for identifying physical instances of an item in the inventory area.

Figure 10:
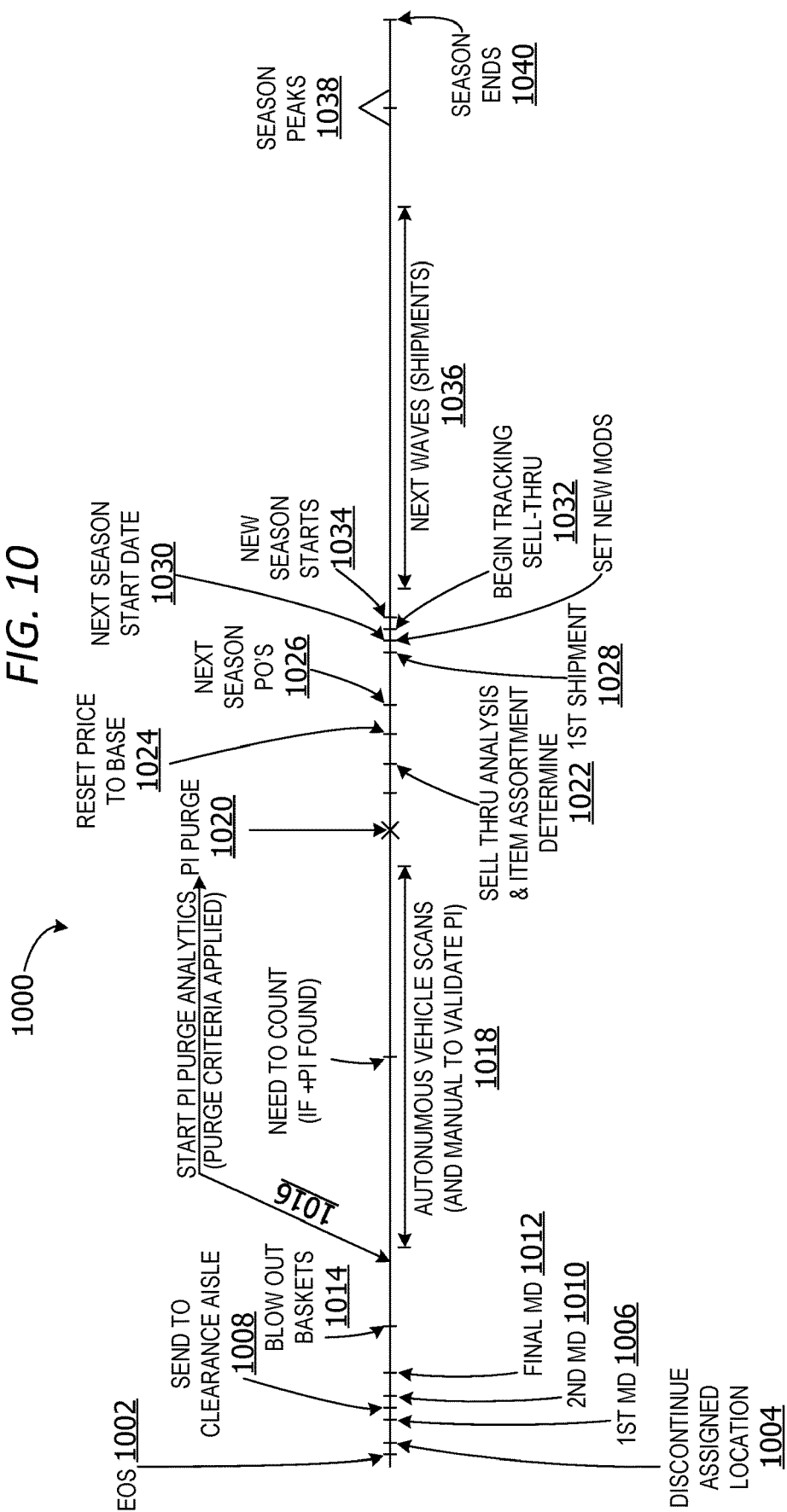
FIG. 10 is an exemplary timeline for PI purge of at least one seasonal item.

FIG. 10 is an exemplary timeline for PI purge of at least one seasonal item. The timeline 1000 in this non-limiting example begins at an EOS 1002 for a selected item. Discontinuation of the assigned modular location occurs at 1004. At 1006 a first MD of the selected item's price occurs. The item is sent to a clearance aisle at 1008. A second MD of the item price occurs at 1010. A final MD of the selected item price occurs at 1012. The item is moved to a Blow-Out Basket (BOB) at 1014.

The PI controller component 112 analyzes item data 118 using the set of PI purge criteria to determine that the item is ready for PI management. The PI controller begins PI purge analytics at 1016.

If the item is a high confidence item, the PI controller component performs an automatic PI purge at 1020. If the selected item is a low confidence item based on the set of confidence rules, the PI controller gathers sensor data from a set of sensors, including sensor data from mobile robotic sensor device(s) and/or manual scanner(s), to validate physical inventory for the selected item at 1018. If no physical instances of the item are found, the PI for the item is purged at 1020.

In this non-limiting example, the PI controller component performs sell-thru analysis and item assortment determinations based on item data and transaction data at 1022. The PI controller component resets the item price back to the base price at 1024.

At least one order of the selected item to be received for the next season is made at 1026. In other words, a given quantity of the selected item is ordered from a manufacturer, warehouse, or shipper. A first shipment of the selected item is received at 1028. The next SOS date occurs at 1030. At the SOS date, the physical instances of the selected item are placed on display at an assigned location (modular home) within the inventory area. The system optionally tracks sell-thru of the selected item at 1032 using transaction data 132 to determine a number of the selected item sold via one or more POS devices.

A next season starts at 1034. Next waves of shipments of the items optionally be received at 1036. The season associated with the selected item peaks in this example at 1038. The EOS for the selected item occurs at 1040. The process then begins again with markdowns and performance of PI analytics to determine when to perform PI purge.

Figure 11:
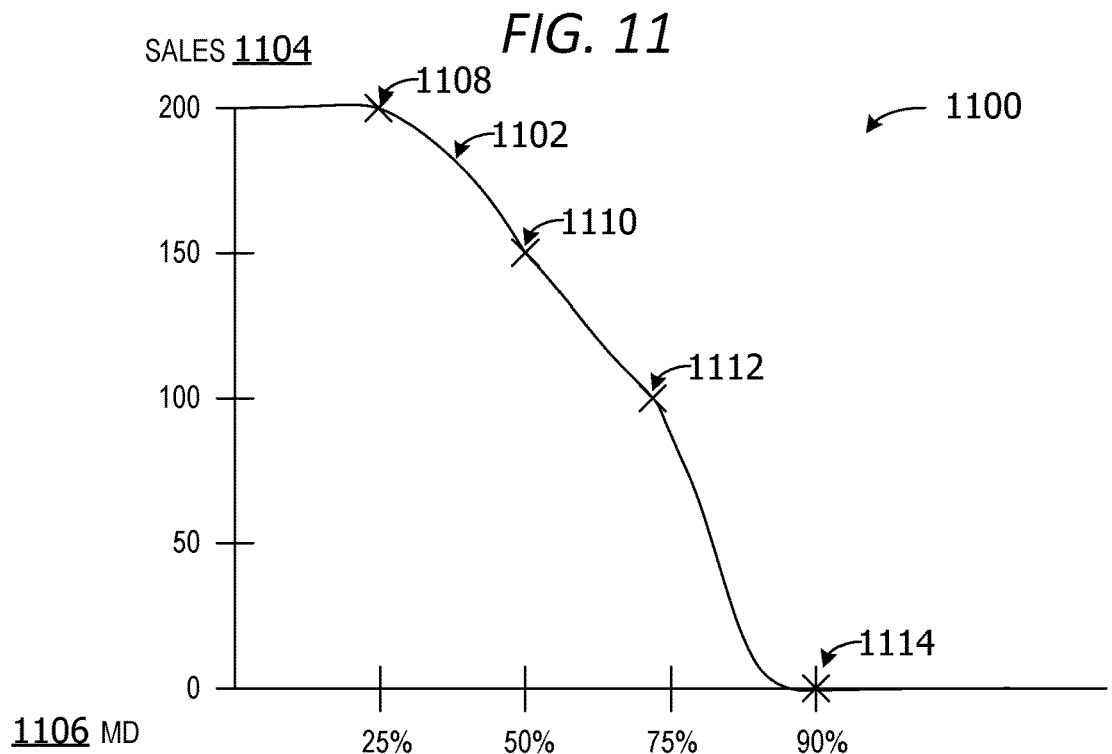
FIG. 11 is an exemplary graph illustrating transactions and price markdowns associated with a selected item over time for PI purge analysis.

FIG. 11 is an exemplary graph 1100 illustrating transactions and price markdowns associated with a selected item over time for PI purge analysis. The y-axis shows sales at 1104. The x-axis shows price markdowns (MD) at 1106. The item sales 1104 occurring at each price markdown (MD) 1106 level occurring over time is shown by line 1102. The graph 1100 shows sales of items at approximately 200 units per day when the per-unit price is marked down to 25% at 1108. Approximately 150 units are sold per day when the per-unit price is marked down to 50% at 1110. When the price-per-unit is marked down to 75% at 1112, the number of units sold is approximately 100. At 1114, when the price markdown reaches 90% off, the number of units sold is zero. If the system inventory shows a positive inventory value for the selected item after the sales of the item at 90% off reaches zero, the PI controller assumes the positive inventory value is PI inventory to be purged.

Figure 12:
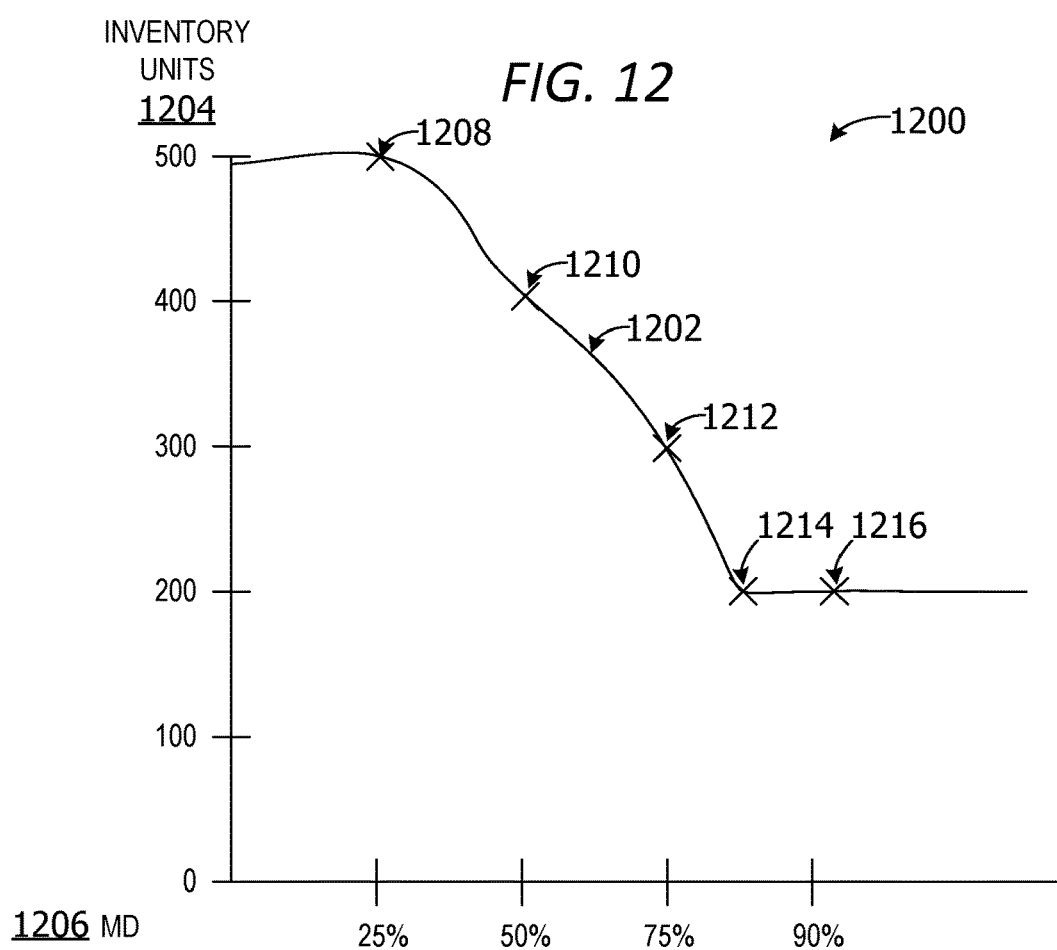
FIG. 12 is an exemplary graph illustrating system inventory values and price markdowns over time for utilization in PI purge analysis.

FIG. 12 is an exemplary graph 1200 illustrating system inventory values and price markdowns over time for utilization in PI purge analysis. The x-axis shows a number of units in inventory of a given item at 1204. The ye-axis shows a markdown (MD) level at 1206. The decreasing inventory value for the item as the per-unit price decreases due to price markdowns is shown by line 1202. The graph 1200 shows the inventory value decreasing until the price markdown reaches 90%.

In this non-limiting example, the number of units at a 25% markdown is approximately 500 units at 1208. The number of units at 50% decreases to approximately 114 units at 1210, indicating sale of approximately 100 units. At 1212, the inventory units are at approximately 300 units in system inventory when the price markdown reaches 75%. At 90% markdown, transactions associated with the item stabilizes at approximately 200 units at points 1214 and 1216.

When the number of units in inventory remains at approximately 200 units after the price aches 90%, as shown at points 1214 and 1216, the PI controller component assumes the positive inventory value of 100 units which remains unsold at 90% markdown is PI inventory to be purged.

FIG. 13 is an exemplary graph 1300 illustrating a time until next SOS date prioritization variable for selecting an item for PI purge analysis. The line 1302 illustrates an increasing priority 1306 assigned to an item as a time until a next SOS date for the item decreases 1304. Thus, the priority for the item is increases when the time until the next SOS date decreases from 60 days to 30 days.

FIG. 14 is an exemplary graph 1114 illustrating a time until discontinuation of an assigned location prioritization variable for selecting an item for PI purge analysis. The graph 1114 illustrates an increasing priority 1402 assigned to an item as the time until discontinuation of an assigned location 1404 of the item decreases. The line 1406 shows greatest PI purge priority is given to the item when discontinuation of the assigned location occurs at 1408.

FIG. 15 is an exemplary graph 1500 illustrating a transaction-inactivity time prioritization variable for selecting an item for PI purge analysis. The graph 1500 illustrates an increasing priority 1502 assigned to an item as the time since a last transaction associated with the selected item 1504 increases. The line 1506 shows a higher priority is given to the item at 60 days since the last transaction than at 30 days since the last transaction.

FIG. 16 is an exemplary graph 1600 illustrating a confidence level for an item based on a weight of the item. In this example, a confidence rule in the set of confidence rules 318 is an item-weight based confidence rule. As the weight of a given item increases 1602, the confidence level 1604 of the item also increases, as shown by line 1606. In other words, an item with a higher weight is a higher confidence item than an item with a lower weight. In a non-limiting example, a package of holiday cookies weighing 5 ounces is a low confidence item while a bird bath item weighing 60 pounds is a high confidence item.

FIG. 17 is an exemplary graph 1700 illustrating a confidence level for an item based on a size of the item. In this example, a confidence rule in the set of confidence rules 318 is an item-size based confidence rule. As the size or dimensions of a given item increases 1702, the confidence level 1704 of the item also increases, as shown by line 1706. In other words, an item with a larger size is a higher confidence item than an item with a smaller size. In another non-limiting example, a three-inch long by two-inch wide package of candy is a low confidence item while a five-foot-tall Christmas tree is a high confidence item.

FIG. 18 is an exemplary graph 1800 illustrating a confidence level for an item based on a base price of the item. In this example, a confidence rule in the set of confidence rules is a per-unit price-based confidence rule. As the per-unit base price of a given item 1312 increases, the confidence level 1804 of the item also increases, as shown by line 1806. In other words, an item with a higher base price is a lower confidence item than an item with a smaller base price. For example, a $2 bag of candy corn is a high confidence item while a five-hundred-dollar artificial Christmas tree is a low confidence item. In another example, expensive items, such as jewelry or furniture, are expected to have fewer sales spread farther apart than less-expensive items, such as candy.

Figure 19:
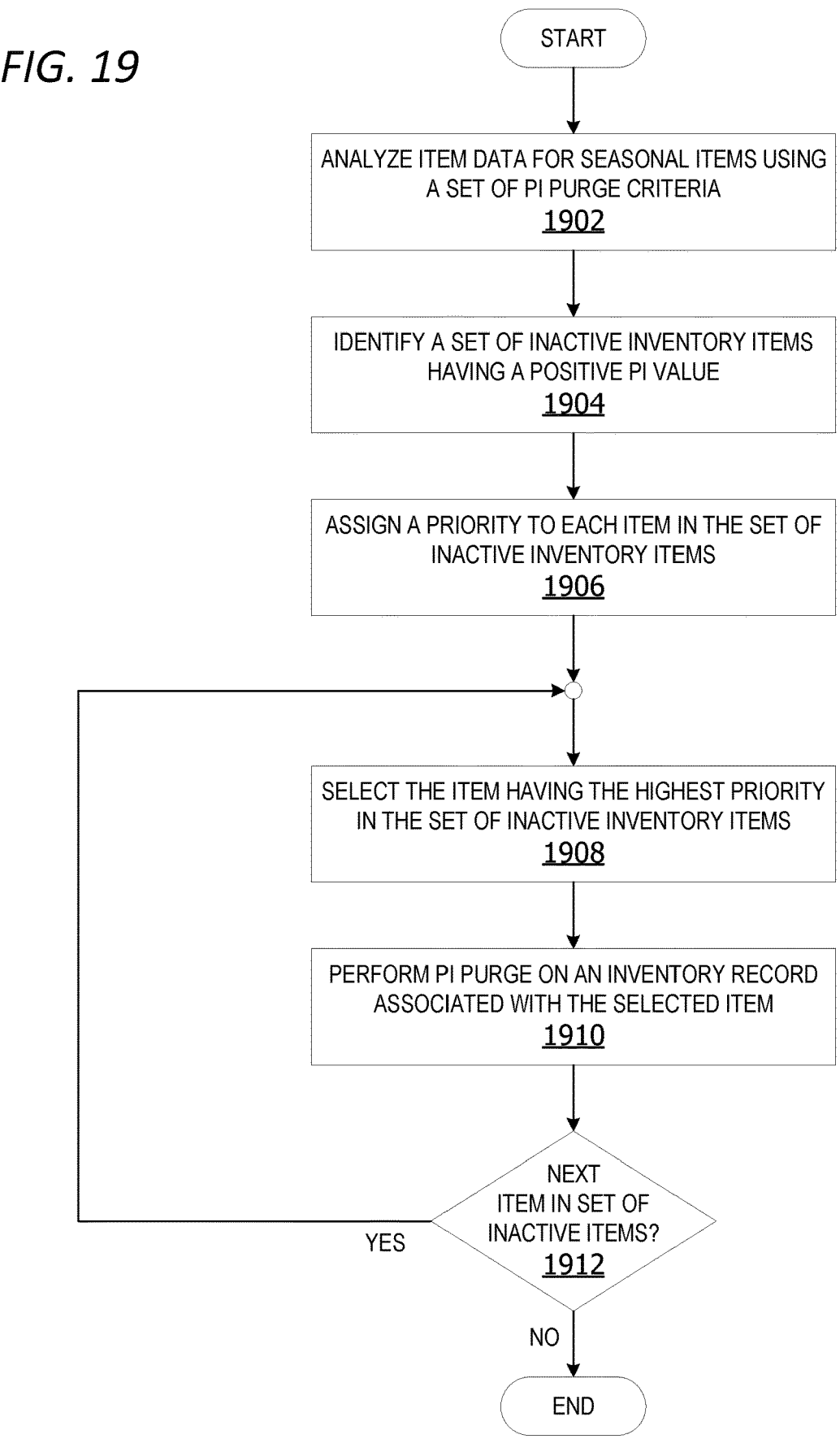
FIG. 19 is an exemplary flow chart illustrating operation of the computing device to select a highest priority item for PI purge analysis.

FIG. 19 is an exemplary flow chart illustrating operation of the computing device to select a highest priority item for PI purge analysis. The process shown in FIG. 19 can be performed by the PI controller component 112 executing on a computing device, such as, but not limited to, the computing device 102 in FIG. 1.

The process begins by analyzing item data for seasonal item using a set of PI purge criteria at 1902. A set of inactive inventory items having a positive PI value is identified at 1904. A priority is assigned to each item in the set of inactive items at 1906. The item having the highest priority in the set of inactive inventory items is selected at 1908. A PI purge is performed on an inventory record associated with the selected item at 1910. The PI purge sets the inventory value to zero.

A determination is made whether a next item remains in the set of inactive items at 1912. If yes, the process returns to 1908 to select a next highest priority item in the set of inactive items. The process iteratively executes operations 1908-1912 until no items remain in the set of inactive items. The process terminates thereafter.

While the operations illustrated in FIG. 19 are performed by a server or other computing device, aspects of the disclosure contemplate performance of the operations by other entities. For example, a cloud service can perform one or more of the operations.

Figure 20:
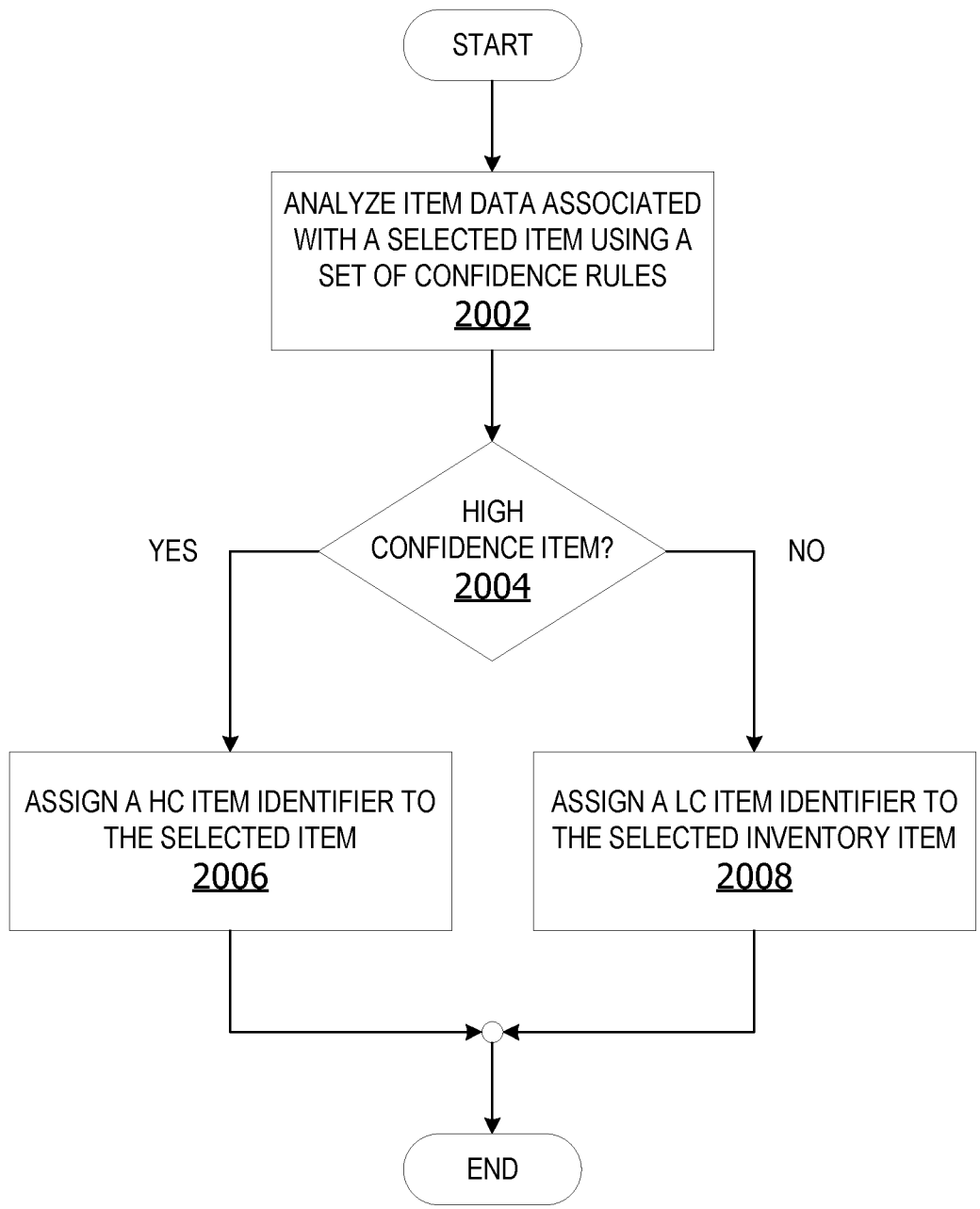
FIG. 20 is an exemplary flow chart illustrating operation of the computing device to assign a high confidence (HC) identifier or a low confidence (LC) identifier to a selected item.

FIG. 20 is an exemplary flow chart illustrating operation of the computing device to assign an HC identifier or an LC identifier to a selected item. The process shown in FIG. 20 can be performed by the PI controller component 112 executing on a computing device, such as, but not limited to, the computing device 102 in FIG. 1.

The process begins by analyzing item data associated with a selected item using a set of confidence rules at 2002. The set of confidence rules is a set of one or more rules, such as the set of confidence rules 318 in FIG. A determination is made whether the item is a high confidence item at 2004. The high confidence item is an item, such as, but not limited to, the high confidence item 320 in FIG. 3. If yes, a HC item identifier is assigned to the selected item at 2006. The process terminates thereafter.

Returning to 2004, if the item is not a high confidence item, a LC item identifier is assigned to the selected inventory item at 2008. The process terminates thereafter.

While the operations illustrated in FIG. 20 are performed by a server or other computing device, aspects of the disclosure contemplate performance of the operations by other entities. For example, a cloud service can perform one or more of the operations.

Figure 21:
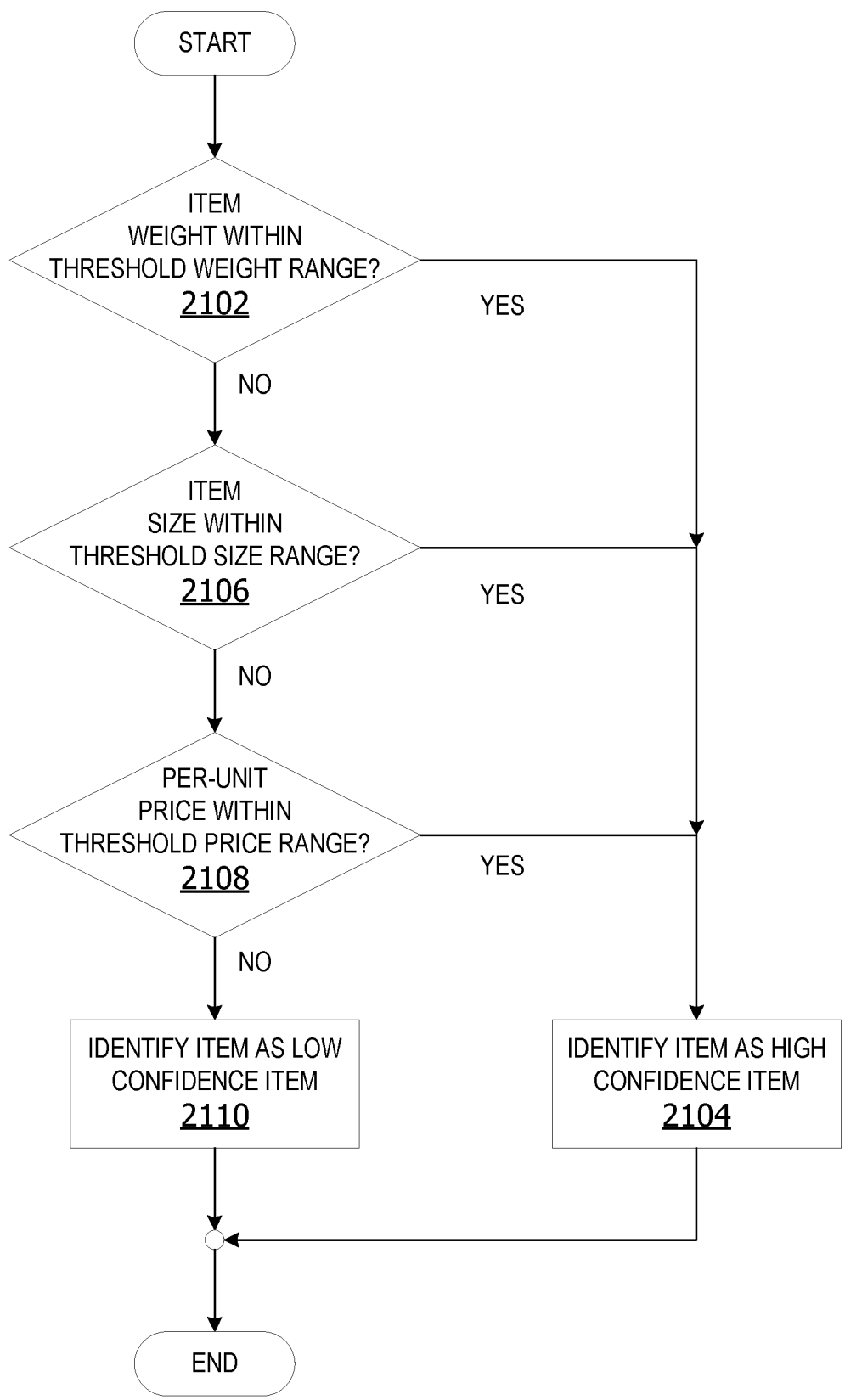
FIG. 21 is an exemplary flow chart illustrating operation of the computing device to analyze an item using a set of confidence rules.

FIG. 21 is an exemplary flow chart illustrating operation of the computing device to analyze an item using a set of confidence rules. The process shown in FIG. 21 can be performed by the PI controller component 112 executing on a computing device, such as, but not limited to, the computing device 102 in FIG. 1.

The process begins by determining if an item weight is within a threshold weight range at 2102. If yes, the item is identified as a high confidence item at 2104. The process terminates thereafter.

Returning to operation 2102, if the item weight is not within the threshold weight range, a determination is made whether an item size is within a threshold size range at 2106. If yes, the item is identified as a high confidence item at 2104. The process terminates thereafter.

Returning to operation 2106, if the item size is not within the threshold size range, a determination is made whether a per-unit price of the item is within a threshold price range at 2108. If yes, the item is identified as a high confidence item at 2104. The process terminates thereafter.

Returning to 2108, if the per-unit price is not within the threshold price range, the item is identified as a low confidence item at 2110. The process terminates thereafter.

Figure 22:
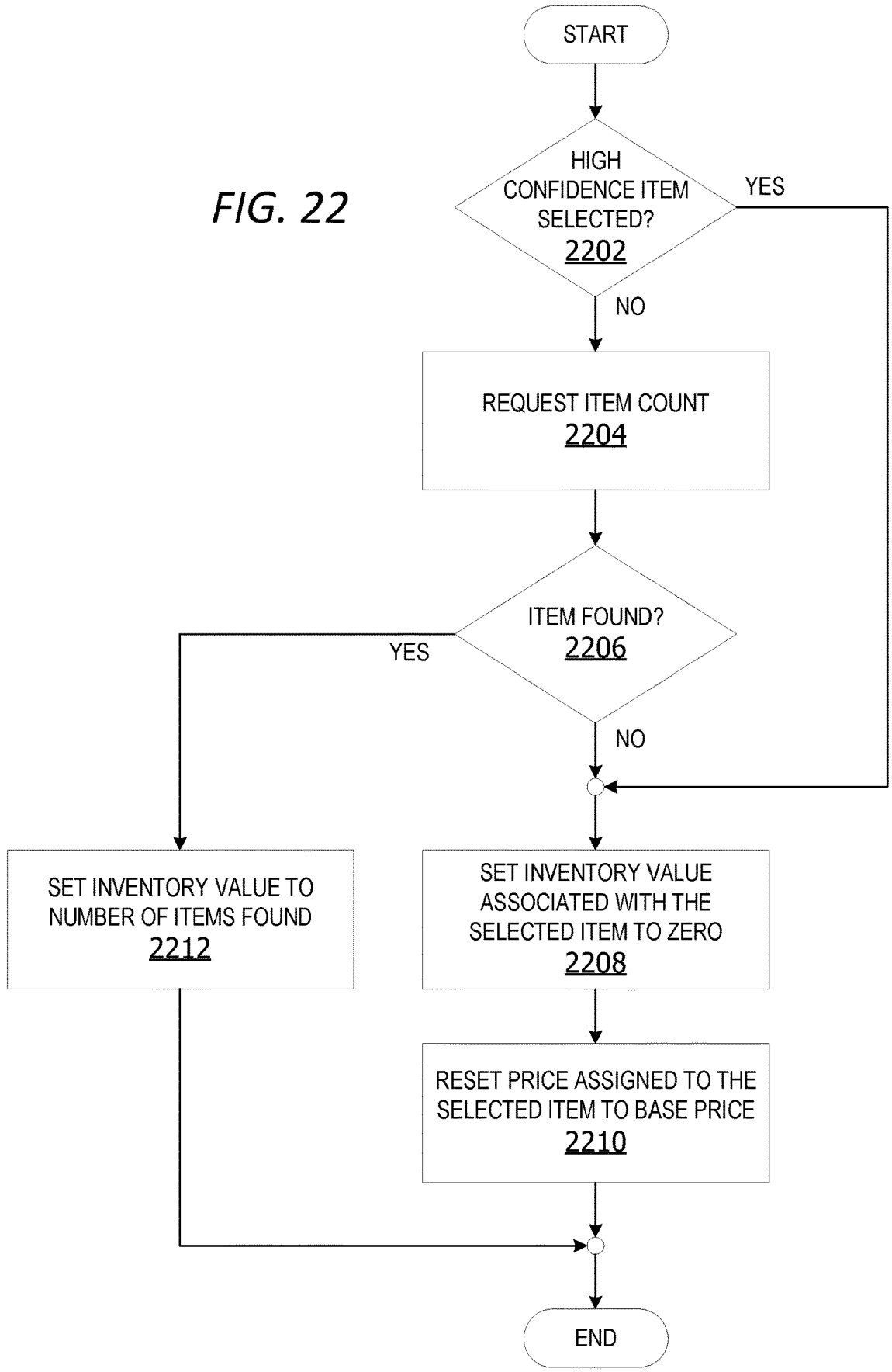
FIG. 22 is an exemplary flow chart illustrating operation of the computing device to perform PI reconciliation of a low confidence item.

FIG. 22 is an exemplary flow chart illustrating operation of the computing device to perform PI reconciliation of a low confidence item. The process shown in FIG. 22 can be performed by the PI controller component 112 executing on a computing device, such as, but not limited to, the computing device 102 in FIG. 1.

The process begins by determining if a high confidence item is selected at 2202. If no, an item count request is made at 2204. A determination is made as to whether the item is found in physical inventory at 2206. If no, the inventory value associated with the selected item is set to zero at 2208. The price assigned to the selected item is reset to a base price at 2210. The process terminates thereafter.

Returning to 2206, if the item is found, the inventory value for the selected item is set to the verified number of items found at 2212. The process terminates thereafter.

Returning to 2202, if the selected item is a high confidence item, the inventory value associated with the selected item is set to zero at 2208. The price assigned to the selected item is reset to the base price for the item at 2210. The process terminates thereafter.

While the operations illustrated in FIG. 22 are performed by a server or other computing device, aspects of the disclosure contemplate performance of the operations by other entities. For example, a cloud service can perform one or more of the operations.

Figure 23:
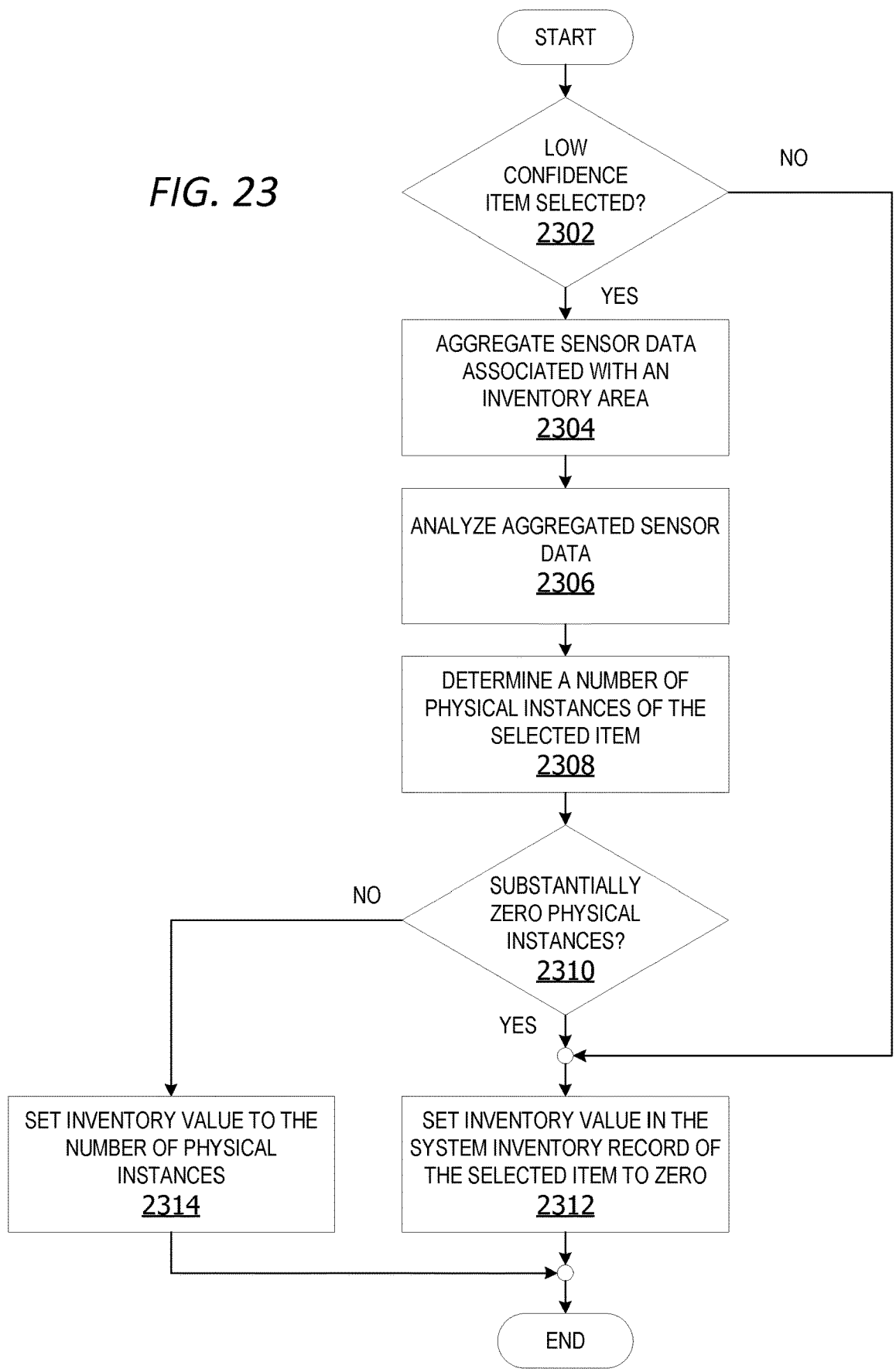
FIG. 23 is an exemplary flow chart illustrating operation of the computing device to perform PI reconciliation of a high confidence item.

FIG. 23 is an exemplary flow chart illustrating operation of the computing device to perform PI reconciliation of a high confidence item. The process shown in FIG. 23 can be performed by the PI controller component 112 executing on a computing device, such as, but not limited to, the computing device 102 in FIG. 1.

The process begins by determining if the selected item is a low confidence item at 2302. If yes, sensor data associated with an inventory area is aggregated at 2304. The aggregated sensor data is analyzed at 2306. A number of physical instances of the selected item are determined at 2308. A determination whether substantially zero physical instances are found at 2310. If yes, the inventory value in the inventory record of the selected item to zero at 2312. The process terminates thereafter.

Returning to 2310, if the number of physical instances found is not substantially zero, the inventory value is set to the number of physical instances found at 2314. The process terminates thereafter.

Returning to 2302, if the item is not a low confidence item, the inventory value in the system inventory record of the selected item is set to zero at 2312. The process terminates thereafter.

While the operations illustrated in FIG. 23 are performed by a server or other computing device, aspects of the disclosure contemplate performance of the operations by other entities. For example, a cloud service can perform one or more of the operations.

ADDITIONAL EXAMPLES

In some examples, a PI controller adjusts the PI for seasonal items which have no sales at other times of the year. A retail store can place markdowns on these remaining seasonal items after the last day of the season to assist with clearing out these seasonal items. The problem is that weeks after the holiday, the PI for these seasonal items linger and this PI must be purged. The seasonal items can include holiday products that do not sell the rest of the year and cannot be carried from year to year. High confidence items like Halloween candy is a typical example for this category.

The PI controller can order a robot to search the inventory area, such as a store and/or a backroom, for these items and consolidate them in a markdown section or a shopping cart. In another example, the PI controller obtains sensor data from sensor devices that automatically scan items as they enter the consolidated area. In a non-limiting example, a smart gondola monitors items loaded onto one or more shelves. In another example, a smart shopping cart utilizes as a merchandizing container. Sensor devices on the cart monitor which items have been loaded or removed from the cart and update.

In some examples, RFID tag readers are utilized to gather sensor data. The RFID tag readers can include one or more chandelier RFID tag reader attached to a ceiling or overhead structure. The RFID tag readers in other examples monitor location and the count of seasonal items at their assigned modular locations and/or in a clearance area.

In yet another example, the sensor devices include one or more cameras to obtain video analytics of the seasonal items and calculate the count of remaining items based on image data generated by the camera(s). The PI controller can coordinate use of sensor data with POS sales data to determine physical item counts. The system ensures the PI for these seasonal items returns to zero within a predetermined time following an EOS date for each seasonal item.

In other examples, if system inventory shows 60,000 units of Halloween candy corn six months after Halloween where the price of the candy corn is marked down to 90% off, the PI controller assumes there are no actual physical instances of the candy corn on-hand in physical inventory because previous historical sales trends and PI purge criteria indicates the candy corn items should no longer be present in physical inventory due to the low markdown price.

In another example, the PI value for the candy corn is five-hundred units. If transaction data shows 150 units sold on day 1; 100 units sold on day 2; 100 units sold on day 3; and no additional units sold thereafter, there are 150 units remaining in system inventory. The PI controller determines the 150 units of candy corn remaining in system inventory is PI to be purged due to the lack of sales.

In an example scenario, the PI controller utilizes a threshold price, which is considered a "giveaway" price. When the threshold price is reached, the PI controller purges the PI value.

In another example, the PI controller utilizes a threshold item duration. The threshold item duration is an amount of time an item remains on a shelf as an additional PI purge criterion. A PI purge criterion can also include a time remaining until an annual inventory and/or an amount of time since a last annual inventory.

The set of confidence rules can include price-per-unit, weight, and/or size of the items, as well as a combination of these features. In some examples, an item is identified as a high confidence item if it is within both a size threshold range and a weight threshold range. In another example, an item is identified as a high confidence item if a price of the item is below a price threshold and a size of the item is within the threshold size range.

In other examples, the PI controller automatically purges the positive PI value in system inventory for seasonal items after an EOS date to prevent shrink due to price changes on incorrect PI, improve replenishment signals, decrease manual labor expended on inventory checks, confirm sell-thru of seasonal items, and improve planning/future orders of items for next season. The PI controller performs PI purge analysis in other examples to validate perceived profitability of seasonal items, reduce improperly deleted system inventory, and reconcile system inventory with physical inventory.

In still another example, a PI analysis component analyzes item data using a set of PI purge criteria to determine whether to purge a positive PI value for a given item in system inventory. The purge criteria in some examples include criteria for selecting items having a definitive selling time-period or season. The purge criteria in other examples include criteria for selecting items which have had one or more previous substantial markdowns. The markdowns increase confidence that the item is physically out-of-stock and the remaining system inventory positive value is overstated or incorrect.

The purge criteria in other examples includes criteria for selecting items without recent sales, items having positive system inventory value, items having no recent picks or bin activity, items having no recent store PI value adjustments and/or items having no recent on-hand inventory adjustments. In other words, items which have not experienced changes in inventory numbers for a given time-period are selected for PI purge analysis. The lack of inventory changes indicates there are no physical instances remaining in on-hand inventory to be purchased or sold. Therefore, inventory the over-inflated system inventory levels remain static.

If a change in system inventory for a selected inventory item occurs indicating sale or purchase of at least one physical instance of the selected inventory item, the PI controller requests an item count to verify the number of physical instances of the selected item in on-hand inventory.

In other examples, items having no modular home and/or items having a pending return to a base price are selected for PI purge analysis. Items are returned to base price in preparation for upcoming new shipments and/or a start of a next season or new selling period for the item.

If an item has no recent sightings or sensor data identifying the item in on-hand inventory and/or no sales/transactions activity associated with the item are selected for PI purge analysis in other examples. The lack of sensor data or sightings associated with physical instances of the item in on-hand inventory by a mobile sensor robot, camera, handheld sensors, RFID tag readers, or other scanners indicates there are no physical instances of the item remaining in on-hand inventory.

In other examples, if there is a sighting or sensor data identifying at least one physical instance of the selected inventory item, the PI controller requests an item count to verify a number of physical instances in on-hand inventory. The system inventory is then updated with the number of physical instances detected during the item count.

Alternatively, or in addition to the other examples described herein, examples include any combination of the following:

responsive to setting the inventory value in the system inventory record associated with the selected item to zero, resetting a price assigned to the selected item to a base price;

identifying an item in the plurality of seasonal items having a transaction-inactivity time greater than the per-item maximum transaction-inactivity threshold time associated with the item, the transaction-inactivity time is an amount of time since the last transaction associated with the item;

adding each identified item having the transaction-inactivity time greater than the per-item maximum transaction-inactivity threshold time to the set of inactive inventory items;

assigning a higher priority to a first item having a next season start date which occurs prior to a next season start date of a second item;

analyzing, by a machine learning component, training data and historical data associated with the plurality of seasonal items to generate a set of variable weights;

applying, by the EOS prioritization component, the set of priority weights to a set of priority variables to generate the set of weighted prioritization variables;

analyzing feedback received from a set of client devices and historical data associated with the plurality of seasonal items to generate an updated set of variable weights, wherein the EOS prioritization component applies the updated set of variable weights to the prioritization variables to generate an updated set of weighted prioritization variables;

analyzing the set of inactive inventory items using the updated set of weighted prioritization variables to select a highest priority inventory item from the set of inactive inventory items;

on determining a price assigned to the selected item is below the price-per-unit threshold, assigning a high confidence item identifier to the selected item;

on determining the price assigned to the selected item is equal to the price-per-unit threshold or greater than the price-per-unit threshold, assigning a low confidence item identifier to the selected item;

on determining a size of the selected item is within the threshold size range, assigning a high confidence item identifier to the selected item;

on determining the size of the selected item is outside the threshold size range, assigning a low confidence item identifier to the selected item;

wherein the PI analysis component analyzes the item data and the transaction data associated with the plurality of inventory items using the set of PI purge criteria to select a set of inactive inventory items having a positive PI value for a transaction-inactivity threshold time following a final-recorded transaction associated with each inventory item in the plurality of inventory items;

an EOS prioritization component, implemented on the at least one processor, that analyzes the item data associated with the set of inactive inventory items using a weighted set of prioritization variables to identify the selected item, wherein the selected item is a highest priority inventory item in the set of inactive inventory items;

a machine learning component, implemented on the at least one processor, that analyzes feedback received from a set of client devices and historical data associated with the plurality of seasonal items to generate a set of variable weights, wherein the EOS prioritization component applies the set of priority weights to a set of priority variables to generate the set of weighted prioritization variables;

wherein the set of confidence rules comprises a price-per-unit threshold, wherein the PI purge component assigns a high confidence item identifier to the selected item on determining a price assigned to the selected item is below the price-per-unit threshold and assigns a low confidence item identifier to the selected item on determining the price assigned to the selected item is equal to the price-per-unit threshold or greater than the price-per-unit threshold;

at least one mobile robotic sensor device associated the inventory area, wherein the at least one mobile robotic sensor device gathers sensor data associated with items within the inventory area in response to the request for an item count;

a set of sensor devices associated with the inventory area, the set of sensor devices generating sensor data which is analyzed to generate a physical item count, the PI purge component sets the inventory value in the system inventory record associated with the selected item to the physical item count in response to the request for an item count;

wherein the set of PI purge criteria further comprises at least one of a maximum transaction-inactivity threshold time, a maximum post-season threshold time, a maximum post-markdown threshold time, minimum threshold time prior to next season, or a maximum threshold time interval since last inventory update;

a set of prioritization variables, the set of prioritization variables further comprising at least one of a perishable item expiration date, discontinuation date of a modular location in the inventory area assigned to a given item, time since last transaction associated with the given item or time until a start date of a next season;

on occurrence of a predetermined event, selecting an inventory item from a plurality of seasonal items associated with an inventory area using a set of PI purge criteria and a set of weighted priority variables, the selected item having a positive PI value for a per-item threshold time after an EOS date;

wherein the predetermined event is an absence of transactions associated with an item for a maximum per-item threshold time;

wherein the predetermined event is a predetermined date; and wherein the predetermined event is a threshold transaction-inactivity time following a final price markdown associated with an item.

At least a portion of the functionality of the various elements in FIG. 1, FIG. 2, FIG. 3, FIG. 4, FIG. 5, FIG. 6, FIG. 7, FIG. 8, and FIG. 9 can be performed by other elements in FIG. 1, FIG. 2, FIG. 3, FIG. 4, FIG. 5, FIG. 6, FIG. 7, FIG. 8, and FIG. 9, or an entity (e.g., processor, web service, server, application program, computing device, etc.) not shown in FIG. 1, FIG. 2, FIG. 3, FIG. 4, FIG. 5, FIG. 6, FIG. 7, FIG. 8, and FIG. 9.

In some examples, the operations illustrated in FIG. 19, FIG. 20, FIG. 21, FIG. 22, and FIG. 23 can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "NFC" as used herein refers, in some examples, to a short-range high frequency wireless communication technology for the exchange of data over short distances.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for PI reconciliation. For example, the elements illustrated in FIG. 1, FIG. 2, FIG. 3, FIG. 4, FIG. 5, FIG. 6, FIG. 7, FIG. 8, and FIG. 9, such as when encoded to perform the operations illustrated in FIG. 19, FIG. 20, FIG. 21, FIG. 22, and FIG. 23, constitute exemplary means for analyzing item data associated with a plurality of seasonal items using a set of PI purge criteria to identify a set of inactive inventory items; exemplary means for selecting a highest priority inventory item from the identified set of inactive inventory items using a set of weighted prioritization variables; exemplary means for setting an inventory value in system inventory record associated with the selected item to zero to eliminate the positive PI value on determining the selected item is a high confidence item; exemplary means for analyzing sensor data obtained from a set of sensor devices associated with the inventory area to locate any physical instances of the selected item on-hand in the inventory area; exemplary means for setting the inventory value in the system inventory record associated with the selected item to zero if substantially zero physical instances of the selected item on-hand; and exemplary means for calculating a physical inventory value representing the number of physical instances of the selected item and setting the inventory value in the system inventory record associated with the selected item to the physical inventory value on locating a number of physical instances of the selected item on-hand.

In another example, the elements illustrated in FIG. 1, FIG. 2, FIG. 3, FIG. 4, FIG. 5, FIG. 6, FIG. 7, FIG. 8, and FIG. 9, such as when encoded to perform the operations illustrated in FIG. 19, FIG. 20, FIG. 21, FIG. 22, and FIG. 23, constitute exemplary means for selecting an inventory item from a plurality of seasonal items associated with an inventory area using a set of PI purge criteria and a set of weighted priority variables on occurrence of a predetermined event; exemplary means for setting an inventory value in system inventory record associated with the selected item at zero to eliminate the positive PI value on determining a per-unit-price of the selected item is within a threshold per-unit-price range; exemplary means for analyzing sensor data obtained from a set of sensor devices associated with the inventory area to calculate a physical inventory value representing a number of physical instances of the selected item within the inventory area; and exemplary means for setting the inventory value in the system inventory record associated with the selected item to the physical inventory value on determining the per-unit-price of the selected item is outside the threshold per-unit-price range.

In still another examples, the elements illustrated in FIG. 1, FIG. 2, FIG. 3, FIG. 4, FIG. 5, FIG. 6, FIG. 7, FIG. 8, and FIG. 9, such as when encoded to perform the operations illustrated in FIG. 19, FIG. 20, FIG. 21, FIG. 22, and FIG. 23, constitute exemplary means for analyzing the aggregated transaction data using a set of PI purge criteria to select an inactive inventory item having a positive PI value for a per-item threshold time following a last-recorded transaction associated with the selected item, the transaction data generated by a plurality of POS devices and stored in the memory and associated with the plurality of inventory items; exemplary means for analyzing item data associated with the selected item using a set of confidence rules to determine whether the selected item is a high confidence item or a low confidence item; exemplary means for removing the positive PI value by setting an inventory value in a system inventory record associated with the selected item to zero on determining the selected item is a high confidence item and resets a price assigned to the selected item to a base price; and exemplary means for requesting an item count to determine physical instances of the selected item on-hand in the inventory area on determining the selected item is a low confidence item.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for perpetual inventory reconciliation, the computer-implemented method comprising:
    analyzing, by a perpetual inventory (PI) analysis component, item data associated with a plurality of seasonal items using a set of PI purge criteria to identify a set of inactive inventory items, the plurality of seasonal items comprising items associated with an inventory area having a positive PI value for a per-item threshold time after an end-of-season (EOS) date, the item data comprising transaction data associated with the plurality of seasonal items;
    selecting, by an EOS prioritization component, an item having a highest priority from the identified set of inactive inventory items using a set of weighted prioritization variables;
    on determining, by a PI purge component, the selected item is a high confidence item based on a set of confidence rules, setting an inventory value in system inventory record associated with the selected item to zero to eliminate the positive PI value;
    on determining the selected item is a low confidence item based on the set of confidence rules, analyzing, by a verification component, sensor data obtained from a set of sensor devices associated with the inventory area to locate any physical instances of the selected item on-hand in the inventory area;
    on occurrence of substantially zero physical instances of the selected item on-hand in the inventory area based on the analyzed sensor data, setting, by the PI purge component, the inventory value in the system inventory record associated with the selected item to zero; and
    on locating a number of physical instances of the selected item on-hand within the inventory area based on the analyzed sensor data, calculating, by the PI purge component, a physical inventory value representing the number of physical instances of the selected item and setting the inventory value in the system inventory record associated with the selected item to the physical inventory value.

2. The computer-implemented method of claim 1, further comprising:
    responsive to setting the inventory value in the system inventory record associated with the selected item to zero, resetting a price assigned to the selected item to a base price.

3. The computer-implemented method of claim 1, wherein the set of PI purge criteria further comprises a per-item maximum transaction-inactivity threshold time, and further comprising:
    identifying an item in the plurality of seasonal items having a transaction-inactivity time greater than the per-item maximum transaction-inactivity threshold time associated with the item, the transaction-inactivity time is an amount of time since a last transaction associated with the item; and adding each identified item having the transaction-inactivity time greater than the per-item maximum transaction-inactivity threshold time to the set of inactive inventory items.

4. The computer-implemented method of claim 1, wherein the set of prioritization variables further comprises a per-item next season start date for each item in the plurality of seasonal items, and further comprising:

assigning a higher priority to a first item having a next season start date which occurs prior to a next season start date of a second item.

5. The computer-implemented method of claim 1, further comprising:

analyzing, by a machine learning component, training data and historical data associated with the plurality of seasonal items to generate a set of variable weights; and applying, by the EOS prioritization component, a set of priority weights to a set of priority variables to generate the set of weighted prioritization variables.

6. The computer-implemented method of claim 5, further comprising:

analyzing feedback received from a set of client devices and historical data associated with the plurality of seasonal items to generate an updated set of variable weights, wherein the EOS prioritization component applies the updated set of variable weights to the prioritization variables to generate an updated set of weighted prioritization variables; and analyzing the set of inactive inventory items using the updated set of weighted prioritization variables to select a highest priority inventory item from the set of inactive inventory items.

7. The computer-implemented method of claim 1, wherein the set of confidence rules comprises a price-per-unit threshold, and further comprising:

on determining a price assigned to the selected item is below the price-per-unit threshold, assigning a high confidence item identifier to the selected item; and on determining the price assigned to the selected item is equal to the price-per-unit threshold or greater than the price-per-unit threshold, assigning a low confidence item identifier to the selected item.

8. The computer-implemented method of claim 1, wherein the set of confidence rules comprises a threshold size range, and further comprising:

on determining a size of the selected item is within the threshold size range, assigning a high confidence item identifier to the selected item; and on determining the size of the selected item is outside the threshold size range, assigning a low confidence item identifier to the selected item.

9. A system for perpetual inventory reconciliation, the system comprising:

a memory; and at least one processor communicatively coupled to the memory;

a PI analysis component, implemented on the at least one processor, that analyzes aggregated transaction data using a set of PI purge criteria to select an inactive inventory item having a positive PI value for a per-item threshold time following a last-recorded transaction associated with the selected item, the transaction data generated by at least one point-of-sale (POS) device and stored in the memory and associated with a plurality of inventory items;

a PI purge component, implemented on the at least one processor, that analyzes item data associated with the selected item using a set of confidence rules to determine whether the selected item is a high confidence item or a low confidence item;

a verification component, implemented on the at least one processor, that requests an item count to determine physical instances of the selected item on-hand in an inventory area on determining the selected item is the low confidence item; and the PI purge component removes the positive PI value by setting an inventory value in a system inventory record associated with the selected item to zero on determining the selected item is a high confidence item and resets a price assigned to the selected item to a base price.

10. The system of claim 9, wherein the PI analysis component analyzes the item data and the transaction data associated with the plurality of inventory items using the set of PI purge criteria to select a set of inactive inventory items having the positive PI value for a transaction-inactivity threshold time following a final-recorded transaction associated with each inventory item in the plurality of inventory items, and further comprising:

an EOS prioritization component, implemented on the at least one processor, that analyzes the item data associated with the set of inactive inventory items using a weighted set of prioritization variables to identify the selected item, wherein the selected item is a highest priority inventory item in the set of inactive inventory items.

11. The system of claim 9, further comprising:

a machine learning component, implemented on the at least one processor, that analyzes feedback received from a set of client devices and historical data associated with the plurality of seasonal items to generate a set of variable weights, wherein the EOS prioritization component applies a set of priority weights to a set of priority variables to generate a set of weighted prioritization variables.

12. The system of claim 9, wherein the set of confidence rules comprises a price-per-unit threshold, wherein the PI purge component assigns a high confidence item identifier to the selected item on determining a price assigned to the selected item is below the price-per-unit threshold and assigns a low confidence item identifier to the selected item on determining the price assigned to the selected item is equal to the price-per-unit threshold or greater than the price-per-unit threshold.

13. The system of claim 9, further comprising:

at least one mobile robotic sensor device associated the inventory area, wherein the at least one mobile robotic sensor device gathers sensor data associated with items within the inventory area in response to a request for the item count.

14. The system of claim 9, further comprising:

a set of sensor devices associated with the inventory area, the set of sensor devices generating sensor data which is analyzed to generate a physical item count, the PI purge component sets the inventory value in the system inventory record associated with the selected item to the physical item count in response to a request for the item count.

15. The system of claim 9, wherein the set of PI purge criteria further comprises at least one of a maximum transaction-inactivity threshold time, a maximum post-season threshold time, a maximum post-markdown threshold time, minimum threshold time prior to next season, or a maximum threshold time interval since last inventory update.

16. The system of claim 9, further comprising:
a set of prioritization variables, the set of prioritization variables further comprising at least one of a perishable item expiration date, discontinuation date of a modular location in the inventory area assigned to a given item, time since a last transaction associated with the given item or time until a start date of a next season.

17. One or more computer storage media, having computer-executable instructions for perpetual inventory reconciliation that, when executed by a computer cause the computer to perform operations comprising:
on occurrence of a predetermined event, selecting an inventory item from a plurality of seasonal items associated with an inventory area using a set of PI purge criteria and a set of weighted priority variables, the selected item having a positive PI value for a per-item threshold time after an EOS date;
setting an inventory value in system inventory record associated with the selected item at zero to eliminate the positive PI value on determining a per-unit-price of the selected item is within a threshold per-unit-price range; and
analyzing sensor data obtained from a set of sensor devices associated with the inventory area to calculate a physical inventory value representing a number of physical instances of the selected item within the inventory area and setting the inventory value in the system inventory record associated with the selected item to the physical inventory value on determining the per-unit-price of the selected item is outside the threshold per-unit-price range.

18. The one or more computer storage media of claim 17, wherein the predetermined event is an absence of transactions associated with an item for a maximum per-item threshold time.

19. The one or more computer storage media of claim 17, wherein the predetermined event is a predetermined date.

20. The one or more computer storage media of claim 17, wherein the predetermined event is a threshold transaction-inactivity time following a final price markdown associated with an item.

* * * * *